US008239131B2

(12) United States Patent
Kindo et al.

(10) Patent No.: US 8,239,131 B2
(45) Date of Patent: Aug. 7, 2012

(54) NAVIGATION DEVICE, NAVIGATION METHOD, AND NAVIGATION PROGRAM

(75) Inventors: Tsuyoshi Kindo, Osaka (JP); Takashi Akita, Kanagawa (JP); Nobuyuki Nakano, Osaka (JP); Ryotaro Iwami, Hyogo (JP); Susumu Kawabata, Osaka (JP)

(73) Assignee: Panasonic Corporation, Osaka (JP)

( * ) Notice: Subject to any disclaimer, the term of this patent is extended or adjusted under 35 U.S.C. 154(b) by 156 days.

(21) Appl. No.: 12/663,306

(22) PCT Filed: Jun. 4, 2008

(86) PCT No.: PCT/JP2008/001419
§ 371 (c)(1),
(2), (4) Date: Jul. 7, 2010

(87) PCT Pub. No.: WO2008/152784
PCT Pub. Date: Dec. 18, 2008

(65) Prior Publication Data
US 2010/0268452 A1 Oct. 21, 2010

(30) Foreign Application Priority Data

Jun. 12, 2007 (JP) ................................. 2007-155603

(51) Int. Cl.
*G01C 21/00* (2006.01)
(52) U.S. Cl. ...................................................... 701/436
(58) Field of Classification Search .................... 342/70, 342/179, 52, 357.52; 701/409, 201, 436; 704/454
See application file for complete search history.

(56) References Cited

U.S. PATENT DOCUMENTS

| 6,268,825 B1 * | 7/2001 | Okada .................... 342/357.52 |
| 6,366,851 B1 | 4/2002 | Chojnack et al. |
| 2007/0075892 A1 * | 4/2007 | Horibe ........................... 342/70 |

FOREIGN PATENT DOCUMENTS

| DE | 101 17 237 | 10/2001 |
| EP | 1 096 229 | 5/2001 |
| JP | 63-142478 | 6/1988 |

(Continued)

OTHER PUBLICATIONS

Supplementary European Search Report issued Dec. 9, 2011 in European Patent Application No. EP 08 76 4016.

(Continued)

*Primary Examiner* — James Trammell
*Assistant Examiner* — Michael D Lang
(74) *Attorney, Agent, or Firm* — Wenderoth, Lind & Ponack, L.L.P.

(57) ABSTRACT

A navigation device displays, on a screen, a route guidance object indicating a route along which the vehicle is to travel, and includes: an image pickup section that obtains a photographed image ahead of the vehicle; a white line detection section that detects a road white line in the photographed image; a map information storage section that stores map information including road shape data which represents the road shape; a road shape data correction section that corrects the road shape data, based on a detection result of the road white line, such that the route guidance object is displayed along the road white line; a route guidance object generation section that generates the route guidance object, based on the corrected road shape data; and the display section that displays the generated route guidance object on the screen.

9 Claims, 24 Drawing Sheets

FOREIGN PATENT DOCUMENTS

| | | |
|---|---|---|
| JP | 7-63572 | 3/1995 |
| JP | 2001-291197 | 10/2001 |
| JP | 2001-336941 | 12/2001 |
| JP | 2002-243469 | 8/2002 |
| JP | 2003-106853 | 4/2003 |
| JP | 2003-121161 | 4/2003 |
| JP | 2003-121167 | 4/2003 |
| JP | 2003-196798 | 7/2003 |
| JP | 2004-205527 | 7/2004 |
| JP | 2004-351994 | 12/2004 |
| JP | 2005-38225 | 2/2005 |
| JP | 2006-52972 | 2/2006 |

OTHER PUBLICATIONS

International Search Report issued Sep. 9, 2008 in International (PCT) Application No. PCT/JP2008/001419.

* cited by examiner

FIG. 2

(A) NODE DATA

| NODE ID | ATTRIBUTE | VALUE |
|---|---|---|
| N1 | LATITUDE | N34° 44' 30" |
| | LONGITUDE | E135° 34' 25" |
| | NUMBER OF LINKED LINKS | 4 |
| | LINKED LINK ID [0] | L1 |
| | LINKED LINK ID [1] | L3 |
| | LINKED LINK ID [2] | L8 |
| | LINKED LINK ID [3] | L12 |
| | ... | ... |
| ... | | |

(B) LINK DATA

| LINK ID | ATTRIBUTE | VALUE |
|---|---|---|
| L1 | INITIAL NODE ID | N1 |
| | TERMINAL NODE ID | N5 |
| | LINK COST | 3 |
| | LINK WIDTH | 15 |
| | ROAD TYPE | 4 |
| | NUMBER OF SHAPE NODES | 3 |
| | SHAPE NODE ID [0] | SN1 |
| | SHAPE NODE ID [1] | SN2 |
| | SHAPE NODE ID [2] | SN3 |
| | ... | ... |
| ... | | |

F I G. 3

(C) ROAD TYPE DATA

| ATTRIBUTE | VALUE |
|---|---|
| EXPRESSWAY | 0 |
| URBAN EXPRESSWAY | 1 |
| PRINCIPAL PREFECTURAL ROAD | 2 |
| PREFECTURAL ROAD | 3 |
| GENERAL ROAD | 4 |
| CHANNEL | 5 |
| NARROW STREET | 6 |

(D) SHAPE NODE DATA

| NODE ID | ATTRIBUTE | VALUE |
|---|---|---|
| SN1 | LATITUDE | N34° 44′ 40″ |
|  | LONGITUDE | E135° 34′ 35″ |
|  | LOCATED-ON LINK ID | L1 |
|  | ... | ... |
| ... | ... | ... |

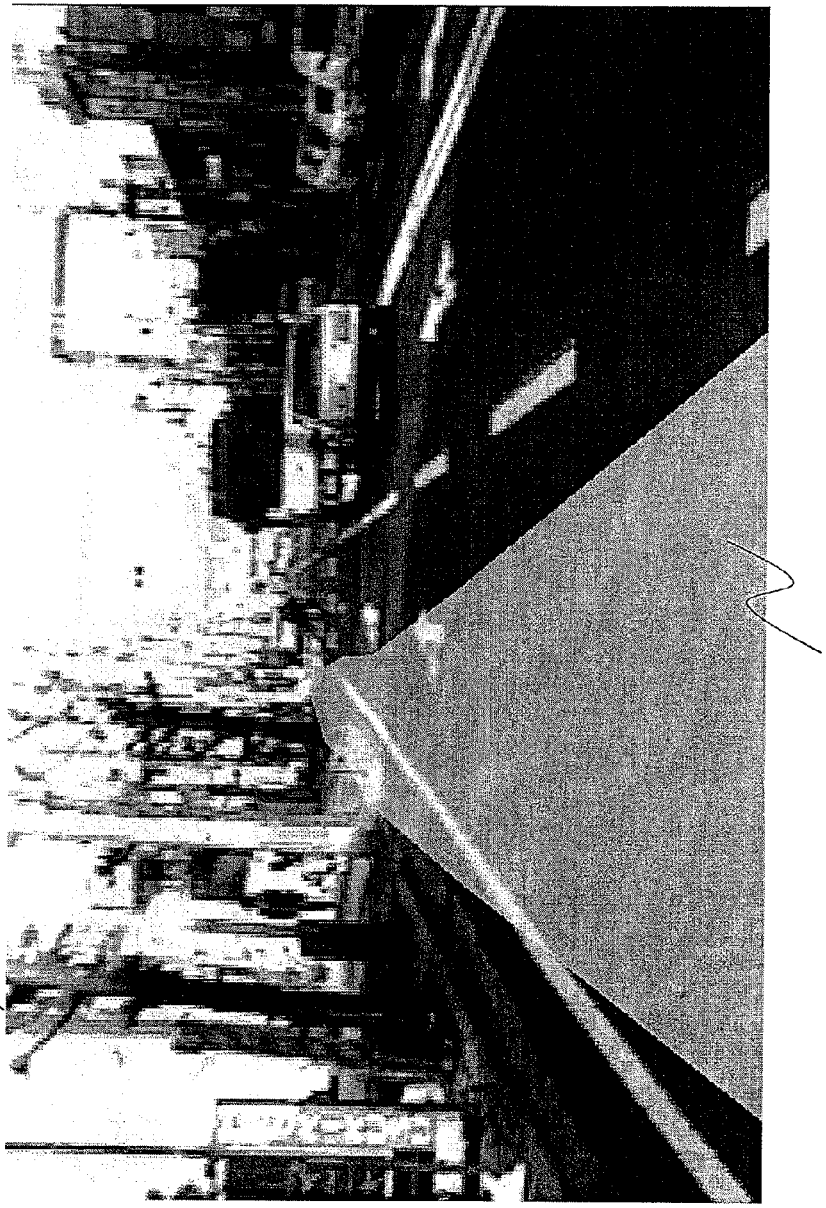

NAVIGATION DEVICE, NAVIGATION METHOD, AND NAVIGATION PROGRAM

BACKGROUND OF THE INVENTION

1. Technical Field

The present invention relates to a navigation device, a navigation method, and a navigation program, and particularly to a navigation device, a navigation method, and a navigation program for displaying a route object, which indicates a traveling route of a vehicle, so as to be superimposed on a photographed image.

2. Background Art

Conventionally, disclosed is an in-vehicle navigation device in which a photographed image of a view ahead of a vehicle is obtained by image pickup means such as a video camera or the like, and which displays an arrow image, as a route guidance object indicating a traveling direction to which the vehicle is to travel, so as to be superimposed on the photographed image when an vehicle approaches a guidance point such as an intersection or the like (see Patent Document 1, for example).

As described above, the navigation device, which displays the route guidance object so as to be superimposed on the photographed image, is convenient for a user (driver) to compare an actual scene viewed through a windshield with the image on a guide screen. Accordingly, this navigation device provides a driver with intuitive route guidance.

Further, a white line detecting device is disclosed in which a photographed image of a view ahead of a vehicle taken by an in-vehicle camera is inputted, candidate points of a road white line are extracted from the photographed image, a Hough transform on the candidate points of the white line is performed thereafter so as to detect a straight line, and the detected straight line is recognized as a road white line (see Patent Document 2, for example).

Still further, a traffic lane tracking device is disclosed which tracks a traffic lane (lane) ahead of a vehicle by using a detection result of a road white line so as to control traveling of the vehicle (see Patent Document 3, for example).

Still further, a navigation device is disclosed which has guiding means for determining a lane to be traveled along by using the number of traffic lanes and information on a traffic lane along which the vehicle is currently traveling, is the number and the information being obtained from a detection result of a road white line, thereby determining a moving direction and a lane position of the vehicle (see Patent Document 4, for example).

Patent Document 1: Japanese Laid-Open Patent Publication No. 7-63572
Patent Document 2: Japanese Laid-Open Patent Publication No. 63-142478
Patent Document 3: Japanese Laid-Open Patent Publication No. 2005-38225
Patent Document 4: Japanese Laid-Open Patent Publication No. 2004-205527

SUMMARY OF THE INVENTION

An in-vehicle navigation device which obtains a photographed image of a view ahead of a vehicle by using image pickup means such as a video camera or the like, and which displays an arrow image for indicating a route along which the vehicle is to travel, as a route guidance object, so as to be superimposed on the photographed image when the vehicle apparatus approaches a guidance point. In such a navigation device, the route guidance object is generated based on road shape data stored in a map database installed in the device. The road shape data generally has an error with respect to the actual road shape, and does not coincide with the actual data as illustrated in FIG. 23. In general, it is known that the error in a positional accuracy (horizontal direction) of the road shape data is about several meters to a few tens meters at present. Here, a black circle illustrated in FIG. 23 represents a guidance point node or a shape node which is included in road shape data, and the guidance point node or the shape node is discretely managed. Accordingly, a problem occurs that when the route guidance object is displayed so as to be superimposed on the photographed image, the route guidance object is out of alignment as shown in FIG. 24. When the route guidance object is out of alignment, a driver is likely to take a wrong route in some locations, whereby guidance is interrupted.

In order to draw the to-be-superimposed route guidance object so as to be in alignment with the road in the photographed image, highly dense and highly accurate road shape data is required. However, the location densities of the guidance point node and the shape node are not generally high, and it consumes high costs and labor time to create such highly dense and highly accurate data.

Therefore, in order to solve the above-described problems, an object of the present invention is to provide a navigation device which is capable of displaying a route guidance object so as to be superimposed on a photographed image in a manner that the route guidance object is in alignment with the road in the photographed image even if accuracy of road shape data is at a current level.

The navigation device according to the present invention is a navigation device which displays, on a screen, a route object indicating a route of a mobile object, the navigation device includes: a traveling zone boundary line detection section that detects a traveling zone boundary line on a road in a photographed image ahead of the mobile object; a map information storage section that stores map information including road shape data which represents a road shape; a road shape data correction section that corrects the road shape data, based on a detection result of the traveling zone boundary line, such that the route object is displayed along the traveling zone boundary line; a route object generation section that generates the route object, based on the corrected road shape data; and a display section that displays the generated route object on the screen.

The "mobile object" in the present invention indicates a vehicle such as an automobile or the like equipped with the navigation device according to the present invention.

The "route object" in the present invention indicates a route guidance object which indicates a route along which the vehicle is to travel, and the route object which indicates the route along which the vehicle has traveled. Accordingly, the present invention is applicable to both of the navigation device which shows a user the route along which the vehicle is to travel, and the navigation device which shows a user the route along which the vehicle has traveled.

Further, the "traveling zone boundary line" in the present invention is a line defining the traveling zone of the mobile object, and includes various traveling zone boundary lines such as a road center line, a traffic lane line, a road edge line, and the like. The traveling zone boundary line may be indicated on a road surface either by raised markers, paint, pebbles or the like.

The navigation device according to the present invention is a navigation device which displays, on a screen, a route guidance object indicating a route along which an vehicle is to travel, the navigation device includes: an image pickup section that obtains a photographed image ahead of an vehicle; a white line detection section that detects a road white line in the photographed image; a map information storage section that stores map information including road shape data which represents the road shape; a road shape data correction section that corrects the road shape data, based on a detection result of the road white line, such that the route guidance object is displayed along the road white line; a route guidance object generation section that generates the route guidance object, based on the corrected road shape data: and the display section that displays the generated route guidance object on the screen.

In the present invention, preferably, the display section displays the route guidance object so as to be superimposed on the photographed image.

In the present invention, preferably, the road shape data is a set of road shape points, and the road shape data correction section generates a first road shape vector along the road white line detected by the white line detection section; draws a perpendicular line from one of the road shape points toward the road shape vector; and sets an intersection point of the road shape vector with the perpendicular line as a corrected road shape point so as to correct the road shape data.

Preferably, the navigation device of the present invention further includes a reliability determination section that determines whether or not the detection result of the road white line is reliable, and when the detection result of the road white line is determined as reliable by the reliability determination section, the road shape correction section corrects the road shape data.

In the present invention, preferably, the road shape data is a set of road shape points, and the road shape data correction section, when the photographed image includes an area in which the road white line is detected and an area in which the road white line is not detected in a mixed manner, corrects the road shape data in the area in which the road white line is not detected such that an angle, with respect to the first road shape vector, of a line segment that links respective road shape points in both of the areas becomes moderate, the respective road shape points being the nearest points in the area in which the road white line is detected and in the area in which the road white line is not detected, to a boundary between the areas.

In the present invention, preferably, the road shape data correction section corrects the road shape data by shifting, parallel to the perpendicular line, the road shape point in the area in which the road white line is not detected.

In the present invention, preferably, the road shape data correction section calculates an angle θ between the first road shape vector and a second road shape vector which is obtained from a link between an vehicle location and a road shape point that is in the area in which the road white line is detected and is farthest in the area from the vehicle location; and rotates each of the road shape points, by angle θ, in the area in which the road white line is detected and the area in which the road white line is not detected so as to allow the farthest road shape point to be located on the first road shape vector so as to correct the road shape data.

Preferably, the navigation device of the present invention further includes an angle difference storage section that stores angle θ, and the road shape data correction section calculates, when the white line detection section does not detect the white line, an average value of the angle θ previously stored, and rotating road shape points by degrees equal to the average value so as to correct the road shape data.

Preferably, the navigation device of the present invention further includes a lane change object generation section that generates a lane change object indicating a direction for a lane change, and the display section displays the lane change object so as to be superimposed on the route guidance object.

According to the present invention, the navigation device is provided which corrects the road shape data based on the white line detection result, so that the navigation device is capable of displaying the route guidance object so as to be superimposed on the photographed image in a manner that the route guidance object is in alignment with the road even if accuracy of the road shape data stored therein is at the current level.

However, a camera has a limit to a recognition accuracy in image recognition, so that, for example, when a vehicle ahead hides the white line, the white line cannot be recognized, or when the white line has been paled out, it becomes hard to recognize the white line or a portion other than the white line is erroneously detected. Consequently, the white line detection result is used for the above-described correction only when the white line detection result is determined as reliable based on a standard of reliability.

Further, when white line detection processing is performed in a manner that the image is partitioned into a plurality of areas, a case sometimes occurs where the white line on a near side can be detected, but the white line on a far side cannot be detected depending on a condition of the road ahead. Even in such a case, the road shape data within the area in which the white line can be detected is positively corrected based on the detection result.

At this time, the road shape data is corrected even in the area in which the white line cannot be detected, such that a road shape based on data is not distorted around the boundary between the area in which the white line is detected and the area in which the white line is not detected. As a result, the highly accurate route guidance object is drawn such that the route guidance object is not extremely bent around the boundary and allows the superimposed display to be recognized well.

Further, when a plurality of lanes lies in the traveling direction of the vehicle, the route guidance object is superimposed on a lane where the vehicle is currently traveling. Accordingly, there is a possibility that the driver is misguided to travel straight ahead on the currently traveling lane without changing lanes, so that the driver cannot change lanes even at a location where the driver has to change lanes, and consequently, the driver fails to timely change lanes. In order to avoid such a problem, the present invention displays the lane change object, which indicates the lane change direction, so as to be superimposed on the route guidance object, so that the driver is secure about the lane change. In addition, since the lane change object is displayed so as to be superimposed on the route guidance object, in comparison with a case of being displayed to be superimposed on another portion, a background of the photographed image is not hidden. Consequently, the driver can easily compare the photographed image with the actual scene.

The present invention is not only applicable to the navigation device of the type where the obtained photographed image is displayed on a display screen but also applicable to a navigation device of a type where the obtained photographed image is not displayed. When a windshield display or a head-up display, for example, is used as the display section, it is not necessary to display the obtained photographed image on the display screen. This is because the actual scene can be viewed through the display.

When the windshield display or the head-up display is used, the route guidance object can be displayed so as to be superimposed on the road in the actual scene which is viewed through the windshield by, for example, preliminarily adjusting a display position of the route guidance object in accordance with the driver's eye level.

BRIEF DESCRIPTION OF THE DRAWINGS

FIG. 2 is a diagram illustrating examples, in the first embodiment, of information recorded on a map database.

FIG. 3 is a diagram illustrating examples, in the first embodiment, of information recorded on the map database.

FIG. 24 is a diagram illustrating the conventional art in which a route guidance object is displayed so as to be superimposed on a photographed image.

Figure 1:
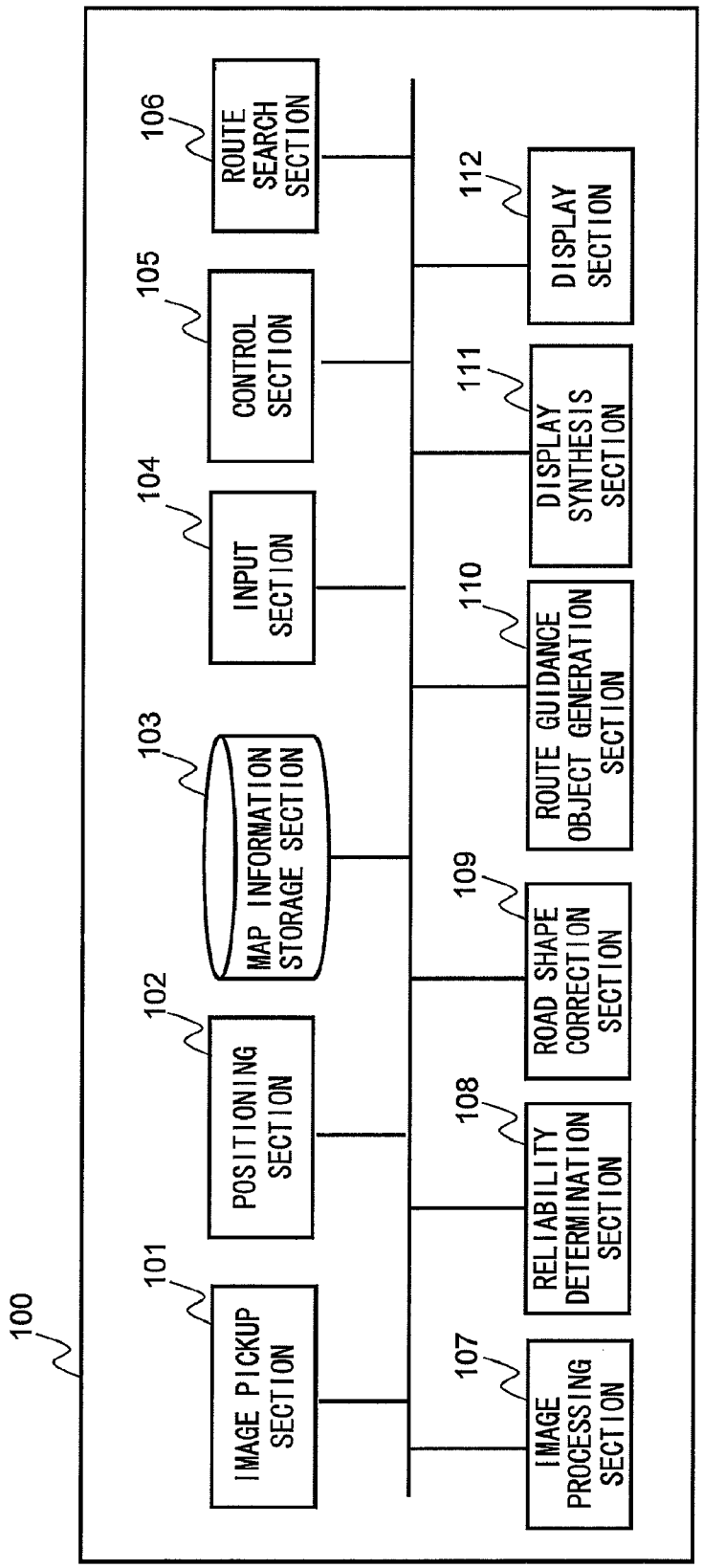
FIG. 1 is a block diagram illustrating a whole configuration of a navigation device according to a first embodiment of the present invention.

DESCRIPTION OF THE REFERENCE CHARACTERS 100 navigation device
101 image pickup section
102 positioning section
103 map information storage section
104 input section
105 control section
106 route search section
107 image processing section
108 reliability determination section
109 road shape correction section
110 route guidance object generation section
111 display synthesis section
112 display section

DETAILED DESCRIPTION OF THE INVENTION

Respective embodiments of a navigation device of the present invention will be described with reference to the drawings. Note that components irrelevant to the present invention are omitted in the drawings.

First Embodiment

FIG. 1 is a block diagram illustrating a whole configuration of a navigation device according to a first embodiment of the present invention. As illustrated in FIG. 1, a navigation device 100 includes an image pickup section 101, a positioning section 102, a map information storage section 103, an input section 104, a control section 105, a route search section 106, an image processing section 107, a reliability determination section 108, a road shape correction section 109, a route guidance object generation section 110, a display synthesis section 111, and a display section 112.

The image pickup section 101 photographs a view ahead of a vehicle, and obtains the photographed image thereof. The image pickup section 101 is, for example, a digital camera. The image pickup section 101 is disposed, for example, on a rear surface of a rearview mirror so as to face ahead of a vehicle, or alternatively disposed on the outside of a roof portion of a vehicle so as to face ahead of the vehicle. Note that the image pickup section 101 may include two or more cameras. When two or more cameras are included, photographed images taken by the cameras may be synthesized.

The positioning section 102 is installed in the vehicle equipped with the navigation device 100, and is means for measuring a current location, a velocity, and an orientation of the vehicle (ones own vehicle). The positioning section 102 includes, for example, a GNSS (GLOBAL Navigation Satellite System) receiver, a velocity sensor, a gyro (angular velocity) sensor, an acceleration sensor, and the like. The GNSS receiver is, for example, a GPS receiver which receives radio waves from plural satellites and demodulates the received radio waves so as to measure the absolute position of the receiver. The GNSS receiver may be a positioning system which uses a carrier phase. Note that, for measuring the current location, the velocity, and the orientation of the vehicle, the GNSS receiver and/or various sensors may be used alone or in combination. Map-matching processing on map information described below can be performed based on the location of the vehicle measured by the positioning section 102.

The map information storage section 103 stores map information which includes data on a road and an intersection, and the map information storage section 103 is, for example, an HDD, a DVD, and a flash memory. The map information storage section 103 may download the map information as necessary from a center facility by using communication means not shown such as a mobile telephone and the like.

Here, the map information stored in the map information storage section 103 is described.

FIG. 2 and FIG. 3 illustrate recording formats of information related to the present embodiment among map information stored in the map information storage section 103.

The map information storage section 103 stores, as the information related to the present embodiment, (A) node data, (B) link data, (C) road type data, and (D) shape node data.

A node represents a spot such as an intersection or a junction from which a road branches off in some directions. The node data includes location information such as latitude and longitude or the like for each node, the number of links, described below, which link to each node, and ID of the links. The location information of the node may be represented by normalized coordinates where either of four corners of a map mesh is defined as an origin point.

The link represents a road which links a node with another node. The link data includes: respective IDs of an initial node and a terminal node, the nodes being end points of the link; a link cost (a link length, for example, and is measured in meters, kilometers or the like); a link width (that is a road width and measured in meters); a road type; and an ID of a shape node described below. Here, the link cost is used in a cost calculation when the route search section 106 performs route searching.

The road type data is data for identifying a type of the above-described link, namely, the road type. The road type data is a unique value assigned to a road in accordance with its type such as an expressway or a general road. Based on the road type data, the route search section 106 is capable of performing route searching after setting a search condition such as the general roads first or the expressways first.

The shape node is a node located on the above-described link, and, when this link is not a straight-line, indicates a bent position for representing a shape of the link. The shape node data includes location information such as latitude, longitude, and the like of this shape node, and an ID of the link on which the shape node is located. The location information of the shape node may be represented by normalized coordinates where an end point of the node is defined as an origin point.

Figure 4:
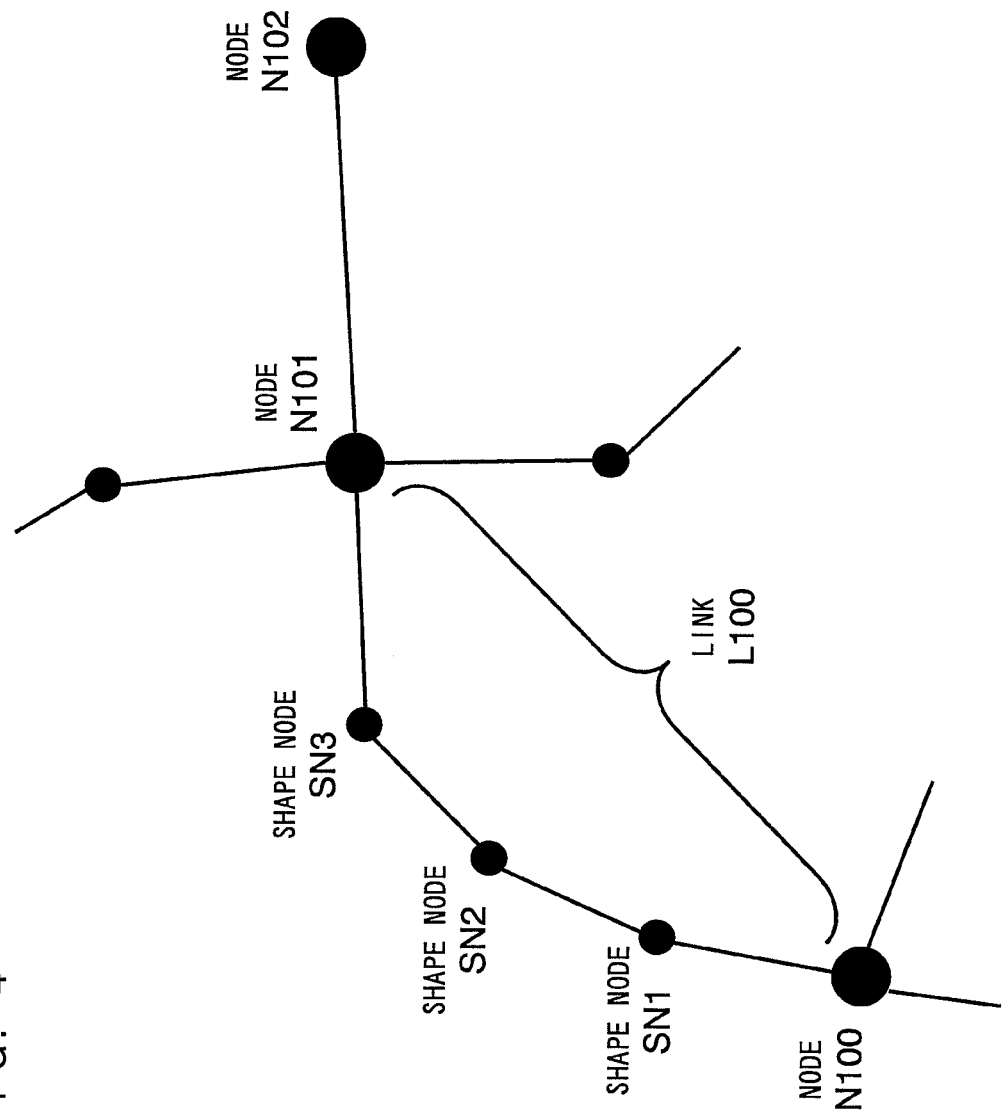
FIG. 4 is a diagram illustrating an example, in the first embodiment, of a road network which is created based on node data, shape node data, and link data, those data being recorded on the map database.

FIG. 4 is a diagram illustrating a construction of the road network which includes, based on the map information stored in the map information storage section 103, the nodes, the shape nodes, and the links. Each node has multiple links linked thereto, thereby linking to other nodes. A shape node is located on a certain link (e.g., link L100) and represents a curved shape of this certain link. When the link is substantially straight, the shape node is not necessarily located. In addition, when nodes are spaced narrowly (e.g., 5 m or less), the shape node is not necessarily located. In the following description, both of the node and the shape node are sometimes referred to as a road shape point.

Note that the map information storage section 103 stores not only the road shape data which allows the above-described road network to be constructed, but also stores background data (rivers, green spaces, and the like), facility data (e.g., information which manages locations of family restaurants and gas stations), and the like, but description thereof is omitted in the present embodiment.

Further, with reference to FIG. 1, components of the navigation device 100 will be described.

The input section 104 is a section through which a user inputs an instruction. The input section 104 is, for example, a unit with multiple press-button switches, a touch-panel unit, a remote-control unit, a microphone with a voice recognition engine for recognizing a user's voice and converting it to information inputted to the navigation device, and the like. The user's instruction includes, for example, instructions for destination search, stopover setting, destination setting, route search condition setting, route search execution, scale change (up or down), switching display modes between a map mode and a photograph mode, and the like. In the photograph mode, the route information is displayed so as to be superimposed on the photographed image. In the map mode, the route information is displayed so as to be superimposed on the map.

The control section 105 controls operations of the whole of the navigation device 100. The control section 105 includes a CPU or a MPU, a ROM (Read Only Memory), and a RAM (Random Access Memory). The CPU or the MPU controls, by executing a program stored in the ROM, operations respectively performed by function blocks illustrated in FIG. 1. The CPU and the MPU use the RAM as a work area during execution of a program.

The route search section 106 searches an optimum route to a destination, based on information on the destination inputted at the input section 104, vehicle location information obtained from the positioning section 102, and data stored in the map information storage section 103. The searched route includes several guidance points (intersections as guidance targets). Whether or not the intersection is the guidance point is determined based on an angle between links running into a node and running from the node, the node being included in the optimum route and corresponding to the intersection that is the determination target. Further, known methods such as Dijkstra algorithm, breadth-first search, and the like may be applied to searching of the optimum route, and optimum route data is typically expressed as a link data string.

The image processing section 107 has a function to detect a road white line in the photographed image which is obtained by the image pickup section 101. The detection of the white line can be performed by a known method. Specifically, the photographed image obtained by the image pickup section 101 is stored in a memory. When the stored image is a color image, the color image is transformed into a gray-scale image. Next, edge extraction is performed on the stored image by using a filter such as a Sobel filter and the like, and the extracted values are binarized. Subsequently, a Hough transform is performed on the binarized values, so that a plurality of linear expressions is obtained. Consequently, a straight line obtained by grouping similar straight lines is detected as the road white line. Preferably, edges in a horizontal direction and in a vertical direction are removed so as to prevent false recognition. Alternatively, a method described in Japanese Laid-Open Patent Publication No. 9-319872 may be employed.

The reliability determination section 108 has a function to determine reliability of a white line detection result obtained by the image processing section 107. Specific processing steps of the reliability determination will be described later.

The road shape correction section 109 has a function to correct, based on the white line detection result, the road shape data stored in the map information storage section 103 when the reliability determination section 108 determines that the white line detection result is reliable. On the other hand, the road shape correction section 109 does not correct the road shape data when reliability determination section 108 determines that the white line detection result is unreliable.

The route guidance object generation section 110 has a function to generate a route guidance object having a shape in alignment with a road which corresponds to the optimum route searched by the route search section 106. The route guidance object is generated as an arrow figure, for example, having a certain width (e.g., a width of the road in the photographed image). The width can be set based on the link width included in the link data. The form of the route guidance object is not limited to the arrow figure, but may be a belt-like figure without a triangular tip, a polygonal line figure, and any other figures. The route guidance object is not limited to that having a length and a width, but may have a thickness heightwise.

The display synthesis section 111 has a function (in the photograph mode) to superimpose the guidance object on the photographed image and to cause the display section 112 to display the superimposed image. Further, the display synthesis section 111 has a function (in the map mode) to display, on the display section 110, a map image around the vehicle location together with a vehicle location mark and the optimum route when necessary. In the map mode, the photographed image is not displayed.

The display section 112 displays road guidance images, respectively, in both the photograph mode and the map mode. The display section 112 is, for example, a display device such as a liquid crystal display, a windshield display, a head-up display, and the like. When the windshield display or the head-up display is used, it is not necessary to display the obtained photographed image. This is because the actual scene can be viewed through the display. In addition, it is possible to minimize eye movement of a driver so as to secure the driver's safety.

When the windshield display or the head-up display is used, by preliminarily adjusting, for example, a display position of the route guidance object depending on driver's eye level, the route guidance object can be displayed so as to be superimposed on a road of the actual scene viewed through the windshield.

Figure 5:
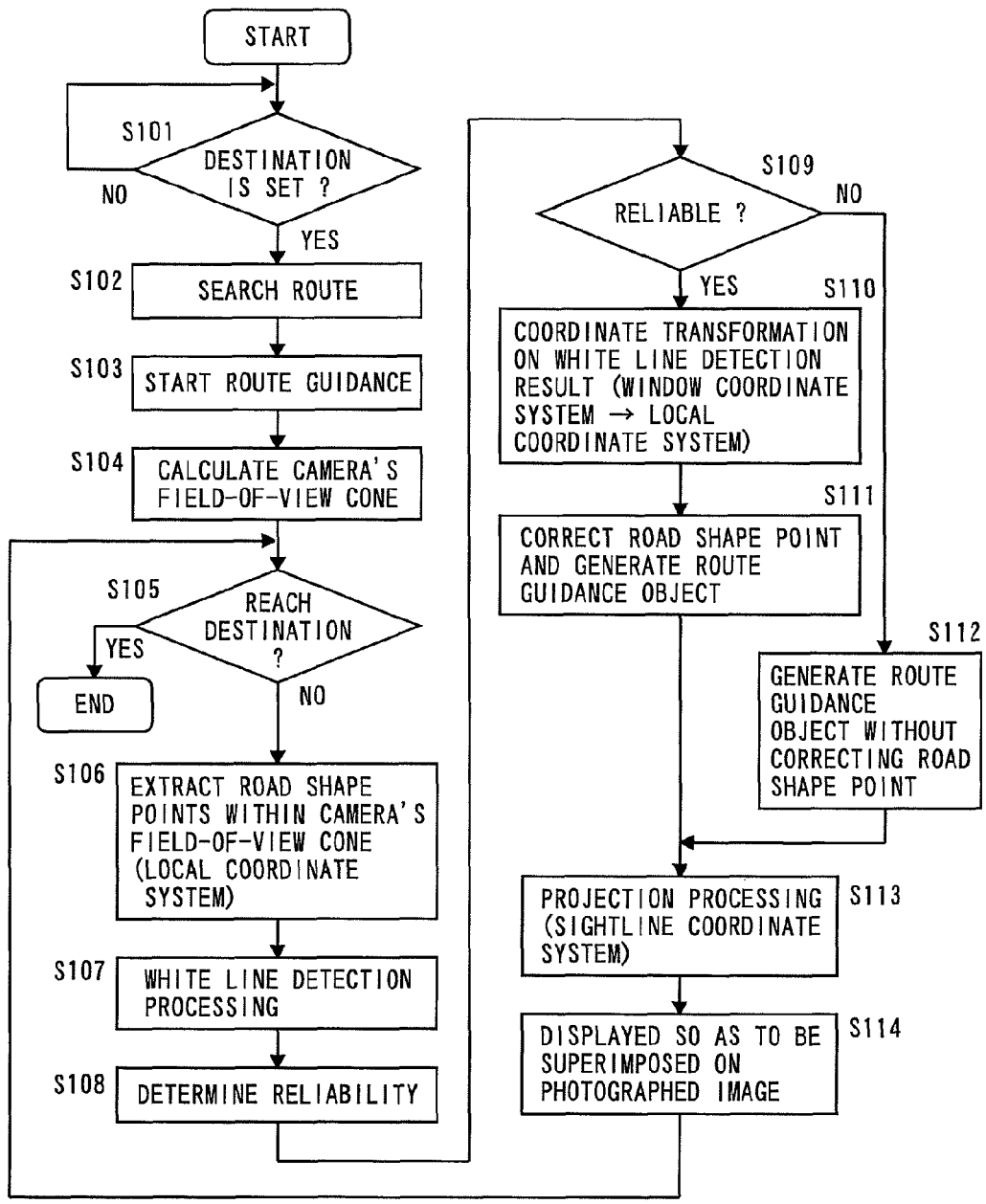
FIG. 5 is a flowchart illustrating an operation of the navigation device according to the first embodiment.

Next, an operation of the navigation device 100 according to the present embodiment in the photograph mode is described with reference to FIG. 5. FIG. 5 is a flowchart illustrating the operation of the navigation device 100 according to the present embodiment.

The control section 105 initially determines whether or not the destination is set through the input section 104 (step S101). When the destination is not set in step S101, the control section 105 returns the processing to S101. On the other hand, when the destination is set in step S101, the route search section 106 searches for, based on the vehicle location information obtained by the positioning section 102, the optimum route to the destination with reference to the map information storage section 103 (step S102). When the optimum route to the destination is searched, the control section 105 starts route guidance (step S103).

Subsequently, the control section 105 calculates a camera's field-of-view cone based on a camera location, a camera attitude (a horizontal angle, an elevation angle), a focal length, and an image size, which are parameters for defining a direction and a range of image pickup performed by the image pickup section 101 (step S104).

Figure 6:
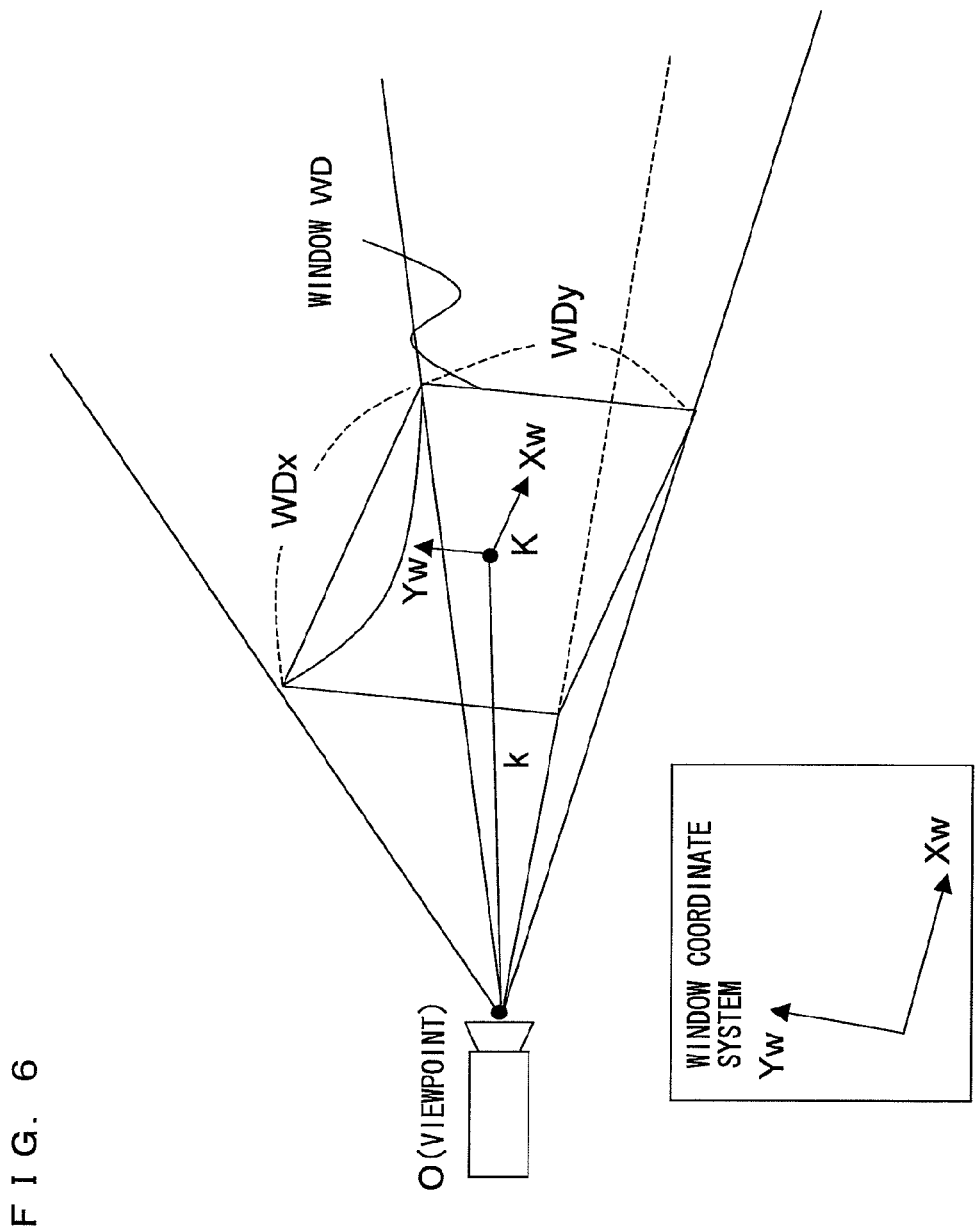
FIG. 6 is a diagram illustrating a camera's field-of-view cone and a window coordinate system in the first embodiment.

FIG. 6 illustrates the camera's field-of-view cone and a window coordinate system. The control section 105 calculates a point (point K) in a three dimensional space, at a distance k forward from the camera location (viewpoint O). Further, the control section 105 sets a plane (window WD), whose size corresponds to the image size and measures WDx wide and WDy long, so as to be perpendicular to a vector which connects viewpoint O with the point K. Here, the window WD has an aspect ratio the same as that of a screen of the display section 112. A coordinate system, with its origin at the point K on the window WD, in which a positive Xw axis points to the right and a positive Yw axis points upward is defined as a window coordinate system. Further, the distance k is determined depending on optical conditions (a view angle, a focal length, and the like) of the image pickup section 101 and on the size of the window WD, such that a range of a field of view when the image pickup section 101 captures a view ahead of the vehicle become coincident with a range of a field of view viewed within a range of the window WD from viewpoint O. A quadrangular pyramid area enclosed by four straight lines which respectively connect viewpoint O with the four corners of the window WD is defined as the camera's field-of-view cone.

Description is continued with reference to the flowchart of FIG. 5.

The control section 105 determines whether or not the vehicle reaches the destination (step S105). When the vehicle is determined to have reached the destination in step S105, the control section 105 terminates the processing. On the other hand, when the vehicle is determined not to have reached the destination in step S105, the control section 105 extracts road shape points within the camera's field-of-view cone (step S106). The operation is specifically described with reference to FIG. 7.

Figure 7:
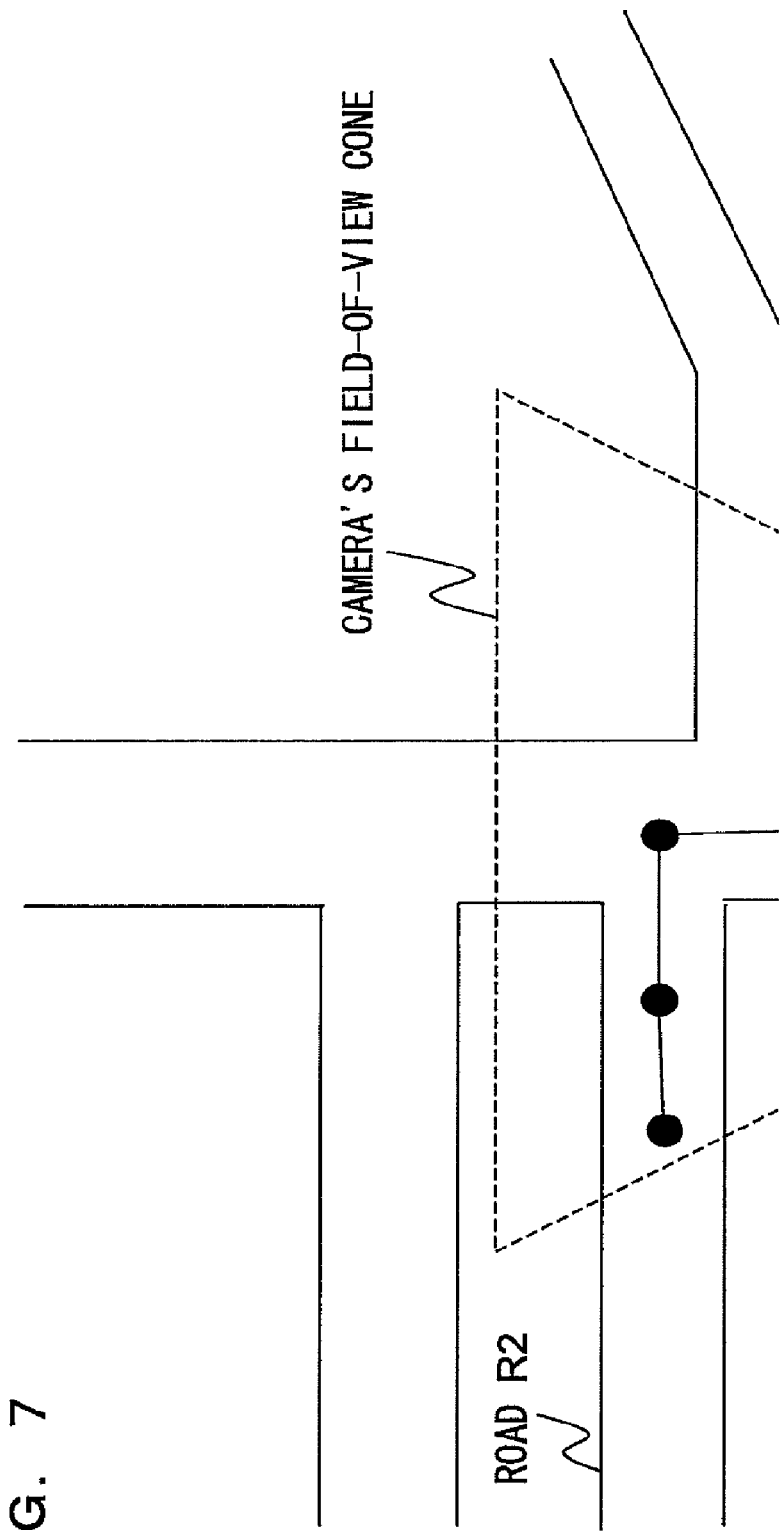
FIG. 7 is a diagram illustrating the camera's field-of-view cone, in the first embodiment, where road shape points are extracted.

FIG. 7 illustrates a case where the road shape points within the camera's field-of-view cone (the triangular area enclosed by dotted lines in FIG. 7) are extracted, and an overhead view of the vehicle in the three-dimensional space on the map and the camera's field-of-view cone. Here, the road shape points near the vehicle are extracted from the link data of the optimum route which has been searched for by the route search section 106. In FIG. 7, the optimum route branches off from a road R1 to a road R2, and the road shape points corresponding to the road R1 and the road R2 are extracted. Note that the road shape points are extracted based on a local coordinate system, with its origin at the vehicle location, where an X1-axis points to the right and a Z1-axis points to the traveling direction of the vehicle. At this time, the vehicle location on the route obtained by map matching is added as a road shape point. As the vehicle travels, the road shape points within the camera's field-of-view cone are sequentially extracted.

Description is continued with reference to the flowchart of FIG. 5.

Subsequently, the image processing section 107 performs white line detection processing (S107). Then, the reliability determination section 108 determines reliability of the white line detection result (S108). The processing of the reliability determination is specifically described with reference to FIG. 8.

Figure 8:
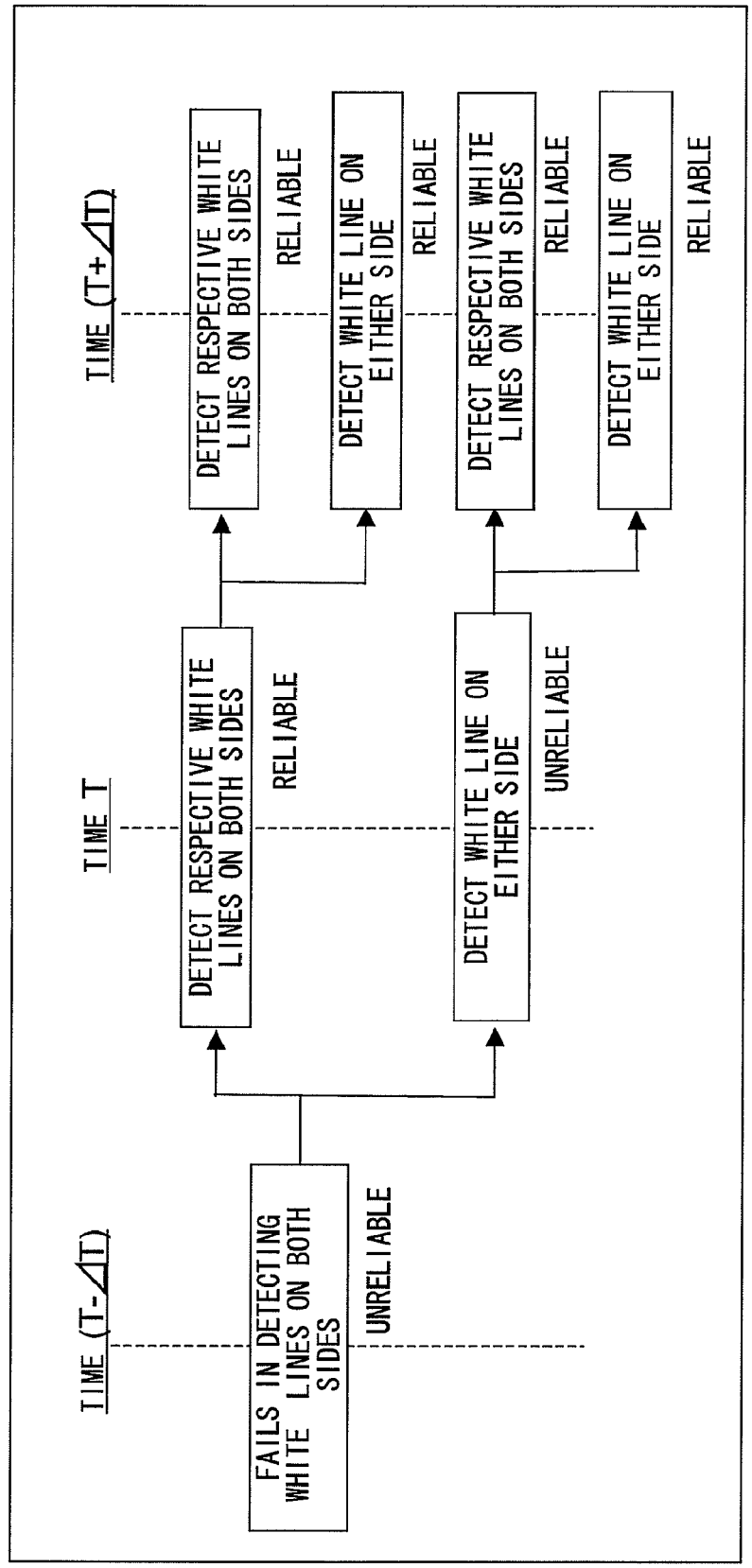
FIG. 8 is a diagram illustrating a process, in the first embodiment, of determining reliability performed by a reliability determination section based on a white line detection result.

FIG. 8 illustrates a process sequence of determining reliability performed by the reliability determination section 108 based on the white line detection result. The white line detection processing is performed every time interval ΔT. As illustrated in FIG. 8, in the white line detection processing performed every time interval ΔT, when the respective white lines on both sides of the vehicle are detected, the white line detection result is determined as "reliable". When the white line on only either side of the vehicle is detected, the white line detection result is determined as "reliable" only in the case where the white line is detected successionally on either side twice or more. In other cases, the white line detection result is determined as "unreliable". By performing the reliability determination in this manner, an influence from false detection can be eliminated. As described above, the image processing results are used in the processing performed by the reliability determination section 108, but any other data can be used therefor. The reliability may be determined, for example, depending on the road type. When the reliability is determined depending on the road type, only the white line detection result on an expressway or on an urban expressway is determined as "reliable", but in other cases, it is determined as "unreliable". Alternatively, data on reliability preliminarily stored in the map information storage section 103 may be loaded therefrom and used. Alternatively, data on reliability downloaded over communication means not shown may be used.

The operation is described again with reference to the flowchart of FIG. 5.

The road shape correction section 109 determines whether or not to correct the road shape data depending on whether the white line detection result is "reliable" or "unreliable" (S109). When the white line detection result is determined as "unreliable", the road shape correction section 109 does not correct the road shape data, and the route guidance object generation section 110 generates the route guidance object based on the road shape data that has not been corrected. On the other hand, when the white line detection result is determined as "reliable", the road shape correction section 109 initially performs coordinate transformation on the white line detection result from the window coordinate system to the local coordinate system (S110). Subsequently, the road shape correction section 109 corrects the road shape data, and the route guidance object generation section 110 generates the route guidance object based on the corrected road shape data (S111). A manner of correcting the road shape data is specifically described with reference to FIG. 9 and FIG. 10.

Figure 9:
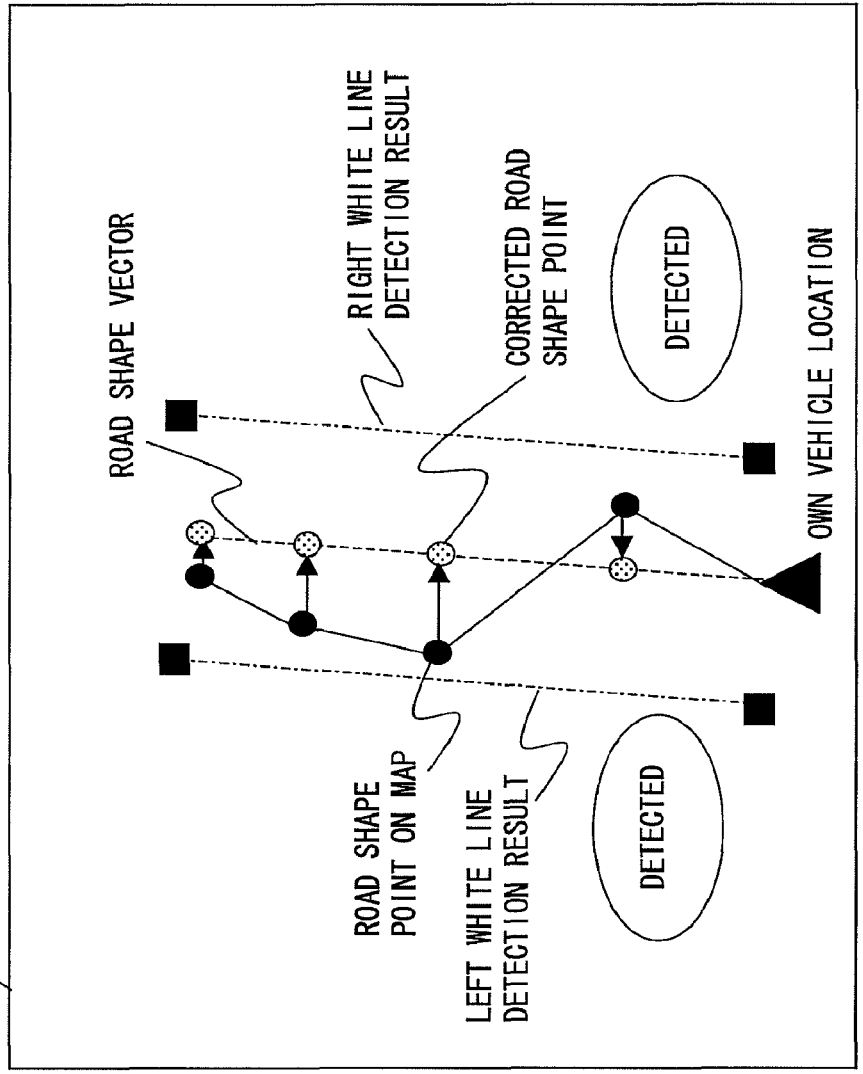
FIG. 9 is a schematic view illustrating a manner of correcting road shape data in the first embodiment when respective white lines on both sides of the vehicle are detected.

FIG. 9 is a schematic view illustrating a manner of correcting the road shape data when respective white lines on both sides of the vehicle are detected. As illustrated in FIG. 9, a road shape vector (indicated by a dotted line) that is a line passing through a midpoint between the white lines (indicated by dashed-dotted lines) are obtained, and perpendicular lines are drawn from the road shape points (indicated by black circles) to the road shape vector, respectively. Subsequently, the correction is performed such that respective intersection points of the perpendicular lines with the road shape vector are set to be the corrected road shape points (indicated by dotted circles).

Figure 10:
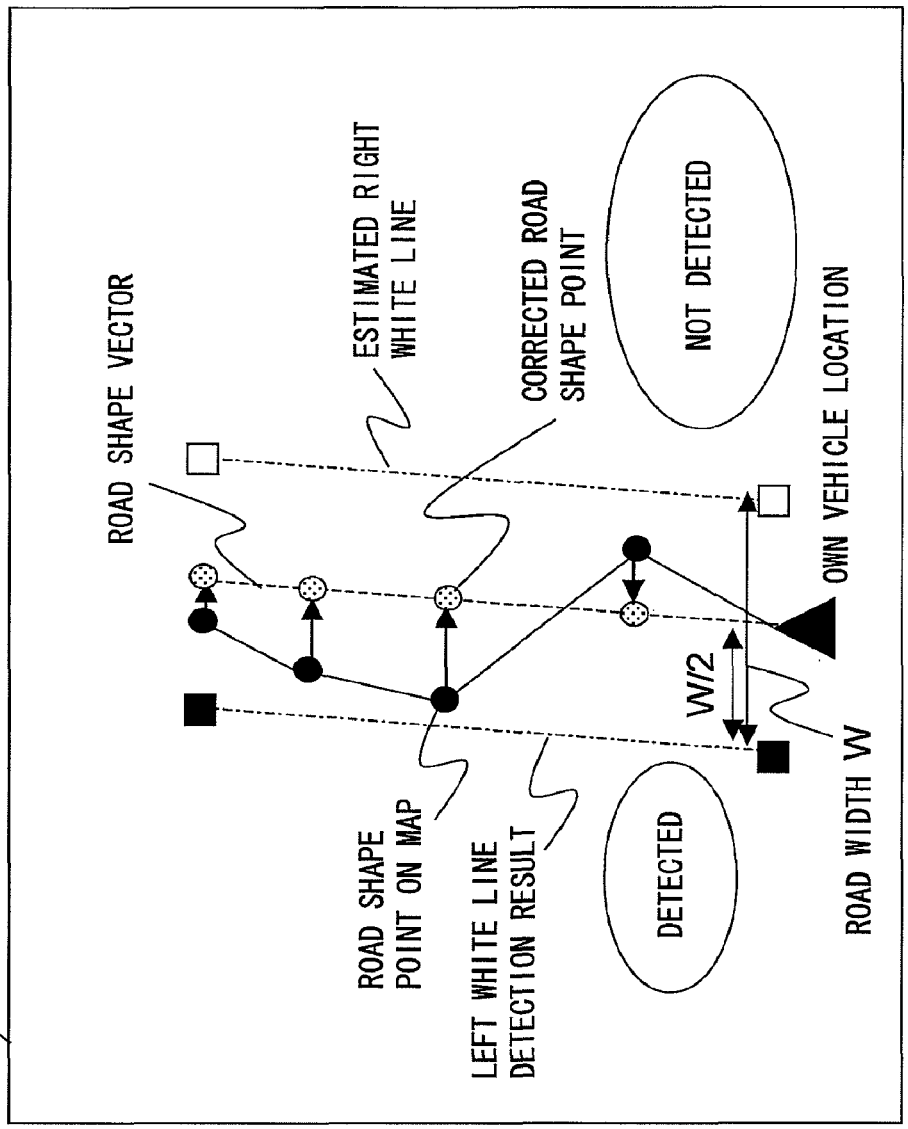
FIG. 10 is a schematic view illustrating a manner of correcting road shape data in the first embodiment when either of the respective white lines on both sides of the vehicle is detected.

FIG. 10 is a schematic view illustrating a manner of correcting the road shape data when either of the white lines on both sides of the vehicle is detected.

Suppose that the left white line (indicated by a left dashed-dotted line) is detected, but the right white line (indicated by a right dashed-dotted line) is not detected, and assuming that the right white line runs in parallel with the left white line, the right white line location is estimated. That is, the right white line location is estimated based on the left white line location and the link width (road width) stored in the map information storage section 103. Then, a line which passes through a midpoint between the left white line and the estimated right white line is set to be a road shape vector (indicated by a dotted line). A correction is performed such that a perpendicular line is drawn from the road shape point to the road shape vector, and an intersection point of the perpendicular line with the road shape vector is set as a corrected road shape point (indicated by a dotted circle).

Description is continued with reference to FIG. 5.

Next, the control section 105 performs projection processing of the route guidance object (S113). Subsequently, the display synthesis section 111 causes the display section 112 to display on a screen thereof an image in which the route guidance object is superimposed on the photographed image (S114). Here, the projection processing is described specifically with reference to FIG. 11.

Figure 11:
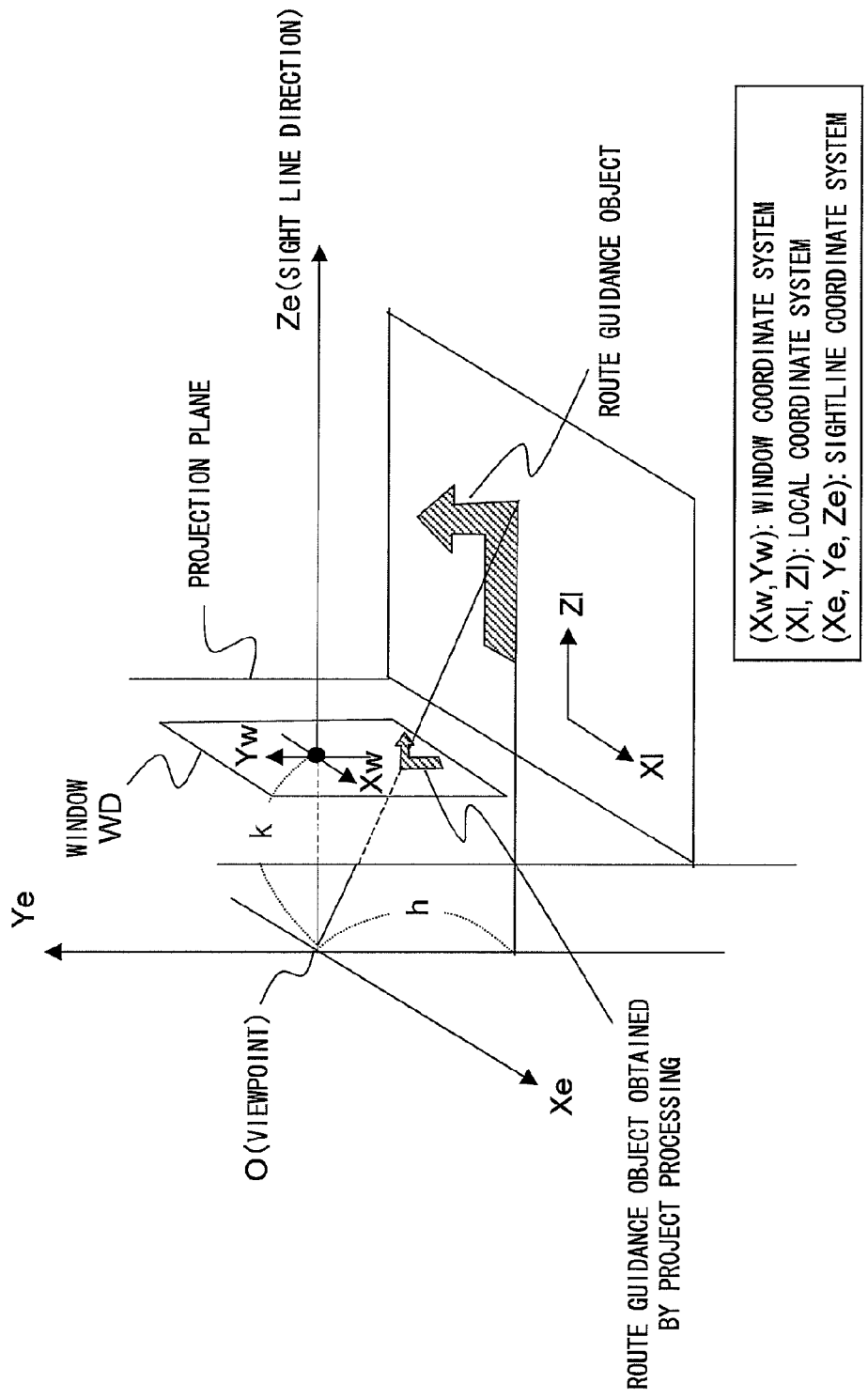
FIG. 11 is a schematic view illustrating projection processing, in the first embodiment, performed on a route guidance object.

FIG. 11 illustrates the projection processing of the route guidance object. As illustrated in FIG. 11, each point included in the route guidance object in the local coordinate system is initially transformed to a three-dimensional sightline coordinate system (Xe, Ye, Ze). The transformation formulas are as follows.

$$Xe = X1$$

$$Ye = -h$$

$$Ze = Z1 \quad \text{(Formula 1)}$$

The sightline coordinate system is a coordinate system, with its origin O at viewpoint location, in which a positive Ze-axis points to a direction of the sight line, a positive Ye-axis points upward, and a positive Xe-axis points to a direction tilted to the right at an angle of 90 degrees with respect to the sight line. Here, h is a height at which the image pickup section 101 is installed. In this manner, the route guidance object can be laid within a plane (i.e., on a road surface) a certain distance below viewpoint in the sightline coordinate system.

Subsequently, each point included in the route guidance object in the sightline coordinate system is transferred by a central projection to a projection plane which is located perpendicularly to the Ze-axis at a location satisfying Ze=k. The formulas are as follows.

$$Xw = kXe/Ze$$

$$Yw = kYe/Ze \quad \text{(Formula 2)}$$

Figure 12:
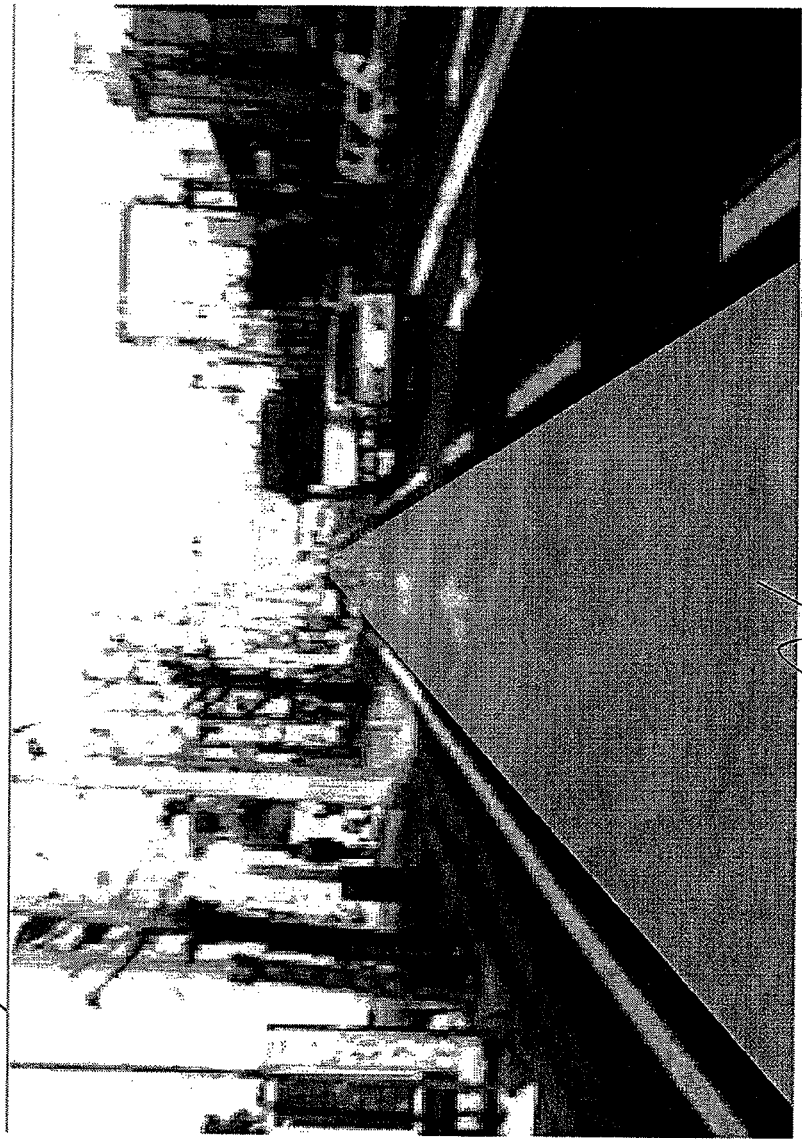
FIG. 12 is a photographed image in the first embodiment where a route guidance object is displayed so as to be superimposed thereon.

Here, the definition of k is the same as that in FIG. 6. In this manner, the field of view within the sightline coordinate system from viewpoint toward the window WD becomes equal to the field of view of the image pickup section 101 for capturing the actual scene. Accordingly, as shown in FIG. 12, the route guidance object is displayed with high accuracy, so that locations corresponding to the road surface and the guidance target intersection in the photographed image can be specified. Note that, as the above-described (Formula 1) and (Formula 2), optimum formulas can be selected depending on definition in the coordinate system or camera parameters.

FIG. 12 shows a case where the route guidance object is displayed so as to be superimposed on the photographed image.

As shown in FIG. 12, since the route guidance object to be superimposed on the photographed image is corrected based on the white line detection result, it is possible to provide a navigation device which is capable of drawing the route guidance object to be superimposed on the photographed image so as to be in alignment with the road with high accuracy even if accuracy of the road shape data of the map is at the current level. However, recognition accuracy in image recognition has a limit (for example, when the white line is hidden by a vehicle ahead, it is impossible to recognize the white line, or when the white line is faded, it is hard to recognize the white line or it is likely to falsely detect portions other than the white line). Accordingly, it is set such that only when it is determined that the white line is correctly recognized based on reliability which is a measure, the white line detection result is used.

In the above-described embodiment, the photographed image photographed by the camera facing ahead of the vehicle, but the route guidance object may be displayed so as to be superimposed on a photographed image preliminarily stored in a storage medium or on a photographed image obtained via communication.

Second Embodiment

Next, a second embodiment will be described with reference to drawings.

Figure 13:
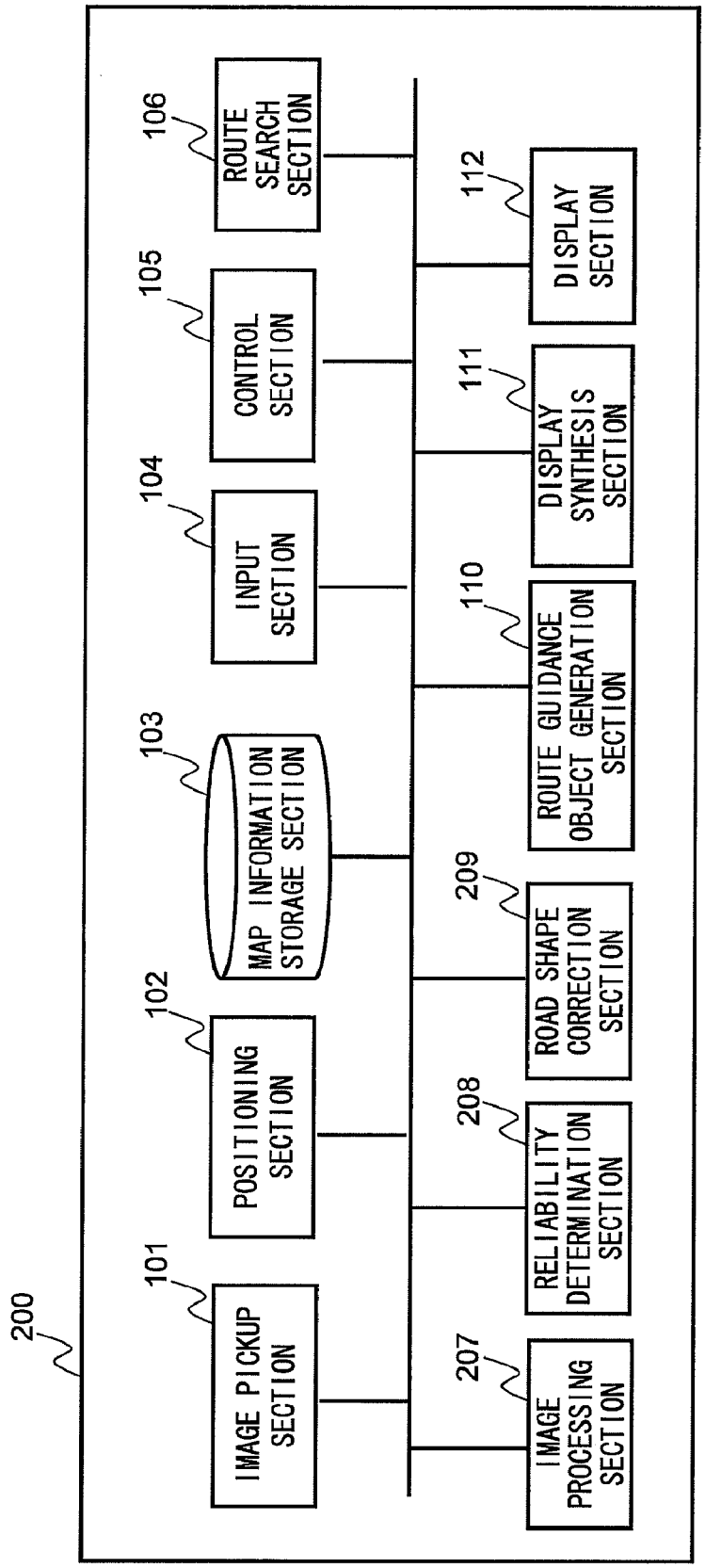
FIG. 13 is a block diagram illustrating a whole configuration of a navigation device according to a second embodiment of the present invention.

FIG. 13 is a block diagram illustrating a whole configure of a navigation device 200 according to the second embodiment. As illustrated in FIG. 13, the navigation device 200 includes an image pickup section 101, a positioning section 102, a map information storage section 103, an input section 104, a control section 105, a route search section 106, an image processing section 207, a reliability determination section 208, a road shape correction section 209, a route guidance object generation section 110, a display synthesis section 111, and a display section 112.

Among components illustrated in FIG. 13, components similar to those in FIG. 1 (first embodiment) are denoted by the same reference numerals and description thereof is omitted. The image processing section 207, the reliability determination section 208, and the road shape correction section 209, which have functions different from those in the first embodiment will be described.

The image processing section 207 has a function to detect a road white line in the photographed image obtained by the image pickup section 101. It is different from the first embodiment that the image processing section 207 partitions the photographed image into a plurality of areas, and detects the white line in each partitioned area sequentially from a near side to a far side. Further, the image processing section 207 has a function to dynamically change the size of the area depending on the previous white line detection result so as to reduce processing load. The white line detection in each area can be performed by using a method similar to that in the first embodiment.

The reliability determination section 208 has a function to determine reliability of the white line detection result obtained by the image processing section 207. The specific method for determining the reliability will be described later.

The road shape correction section 209 has a function to correct road shape data stored in the map information storage section 103, based on the white line detection result obtained by the image processing section 207 and on the reliability determined by the reliability determination section 208. In the present embodiment, different from the first embodiment, a plurality of areas are set on which the image processing is performed, so that there may be a case where both an area in which a white line is detected and an area in which the white line is not detected are included in a mixed manner in the photographed image. In such a case, the road shape correction section 209 has a function to correct the road shape data around a boundary between the areas such that the shape of a route guidance object is not distorted.

Figure 14:
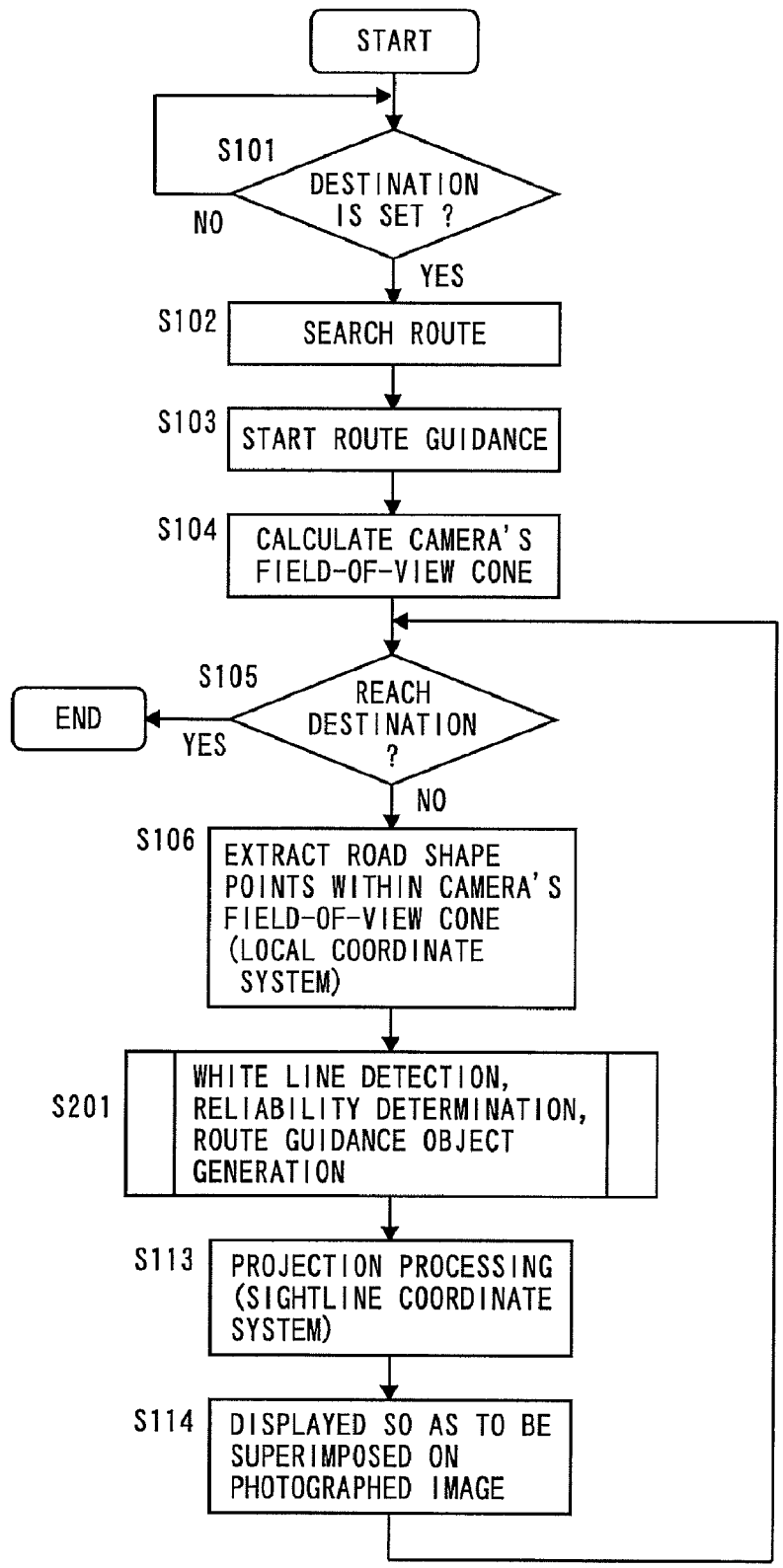
FIG. 14 is a flowchart illustrating an operation of the navigation device according to the second embodiment.

Next, an operation by the navigation device 200 according to the present embodiment in the photograph mode is described with reference to FIG. 14 and FIG. 15. FIG. 14 is a flowchart illustrating the operation of the navigation device 200 according to the present embodiment. In FIG. 14, the same steps as those in FIG. 5 (first embodiment) are denoted by the same step numbers and description thereof is omitted.

The flowchart of FIG. 14 is different from that of FIG. 5 in processes of white line detection, reliability determination, and route guidance object generation performed in step S201. The process steps of the step S201 are described with reference to FIG. 15.

Figure 15:
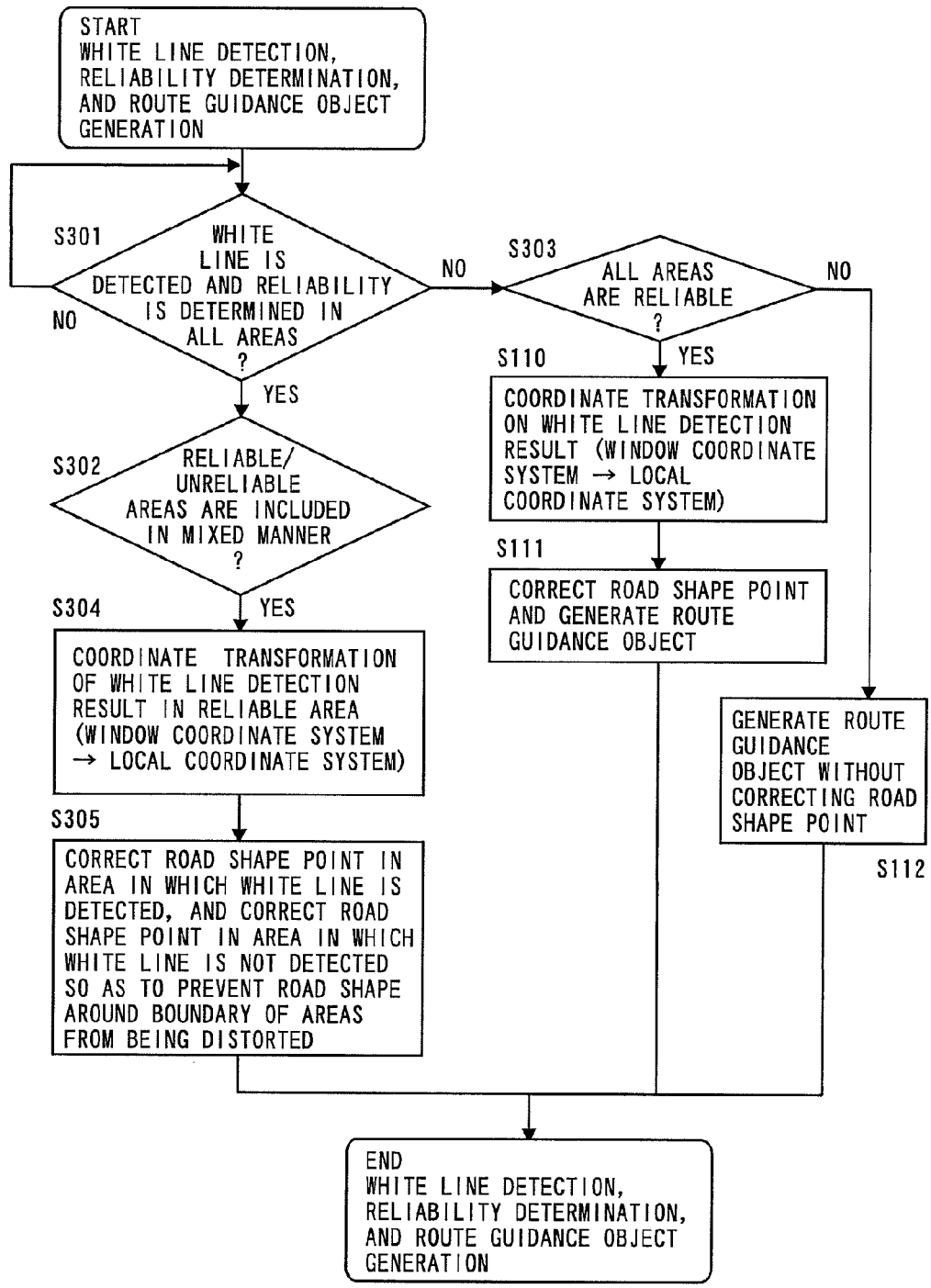
FIG. 15 is a flowchart illustrating an operation of the navigation device according to the second embodiment.

FIG. 15 is a flowchart illustrating the processes performed in step S201 of FIG. 14 in detail.

As illustrated in FIG. 15, the image processing section 207 initially determines whether or not the white line detection and the reliability determination on the white line detection result have been performed in all areas (step S301). When the white line detection and the reliability determination in all areas have not completed, the processing is returned to step S301. The processing is described specifically with reference to FIG. 16.

Figure 16:
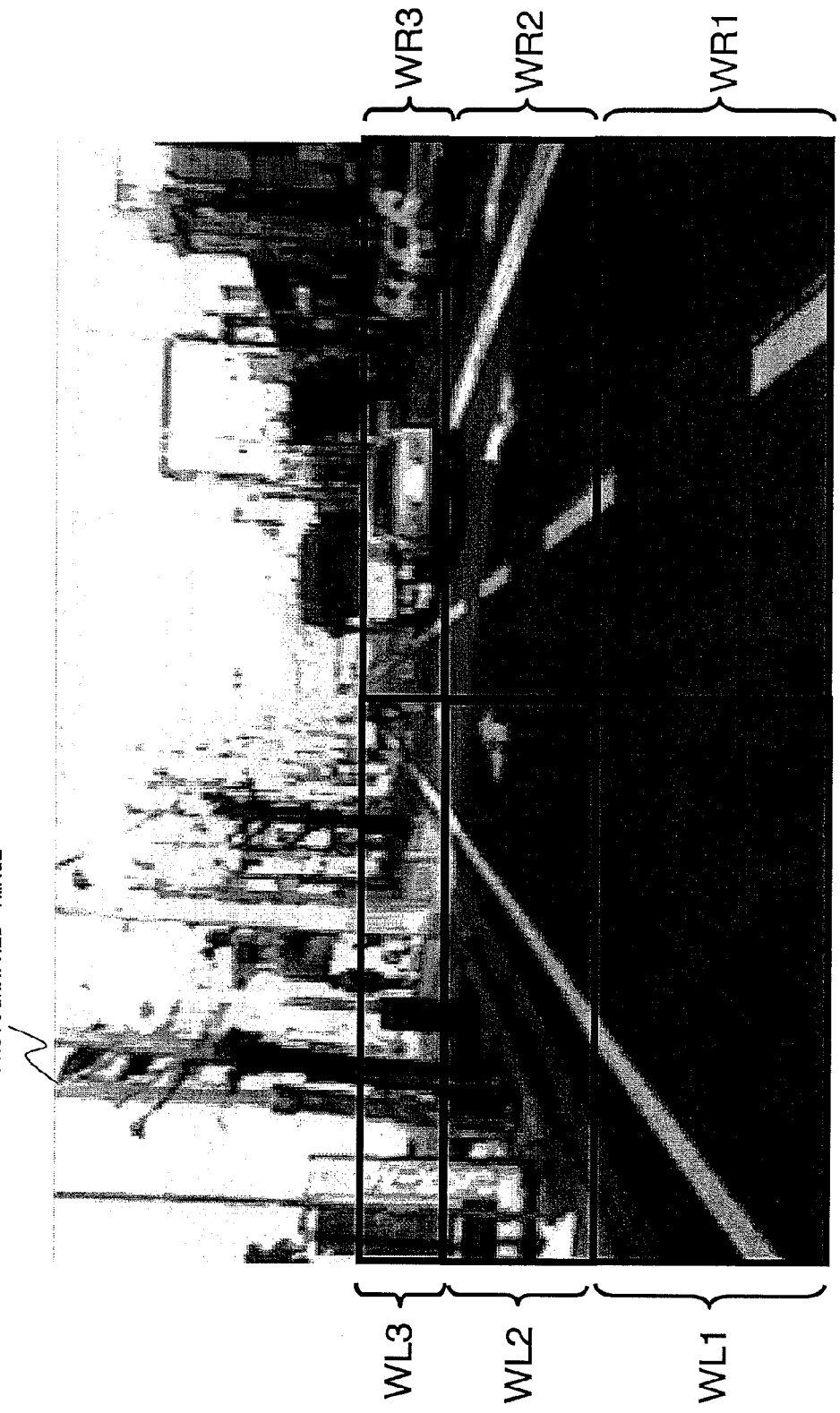
FIG. 16 illustrates a manner in the second embodiment of partitioning an area of a photographed image on which white line detection and reliability determination are performed.

FIG. 16 illustrates an example of areas on which the image processing section 207 and the reliability determination section 208 perform the white line detection and the reliability determination, respectively. In the example shown in FIG. 16, a road portion of the photographed image is partitioned into a right area and a left area, and each of the areas on both sides is respectively partitioned into three areas from the near side (bottom side of the image) to the far side (top side of the image). Accordingly, the road portion is partitioned into six areas in total. The image processing section 207 detects the left white line in the left areas, and the right white line in the right areas.

The area on the nearer side has a longer depth. The area WR1 and the area WL1 cover the range of 0-16 m, the area WR2 and the area WL2 cover 16-50 m, and the area WR3 and the area WL3 cover 50-150 m ahead of the vehicle.

An area in the image farther than a point at which the road disappears is not set as an area in which the white line detection is performed, so that this area is excluded from the white line detection and the reliability determination processing and an amount of calculation is reduced.

The number of partitions of the areas, and the size of each area can be set arbitrarily. The number of partitions especially in a width direction may be decreased or increased depending on the number of traffic lanes.

The white line detection and the reliability determination are performed sequentially from the near side to the far side. The reliability determination processing is performed at a time when the white line detection on both sides of the vehicle has been completed. Target areas for the reliability determination in the range of 0-16 m ahead of the vehicle are the area WR1 and the area WL1, and the reliability determination is performed on such right and left areas in pairs. The specific processes are the same as those in the process sequence illustrated in FIG. 8.

When the white lines are not detected on both sides of the vehicle, the white line detection processing is not performed on the farther areas and the reliability is determined as "unreliable". In this manner, an amount of calculation can be reduced.

Figure 17:
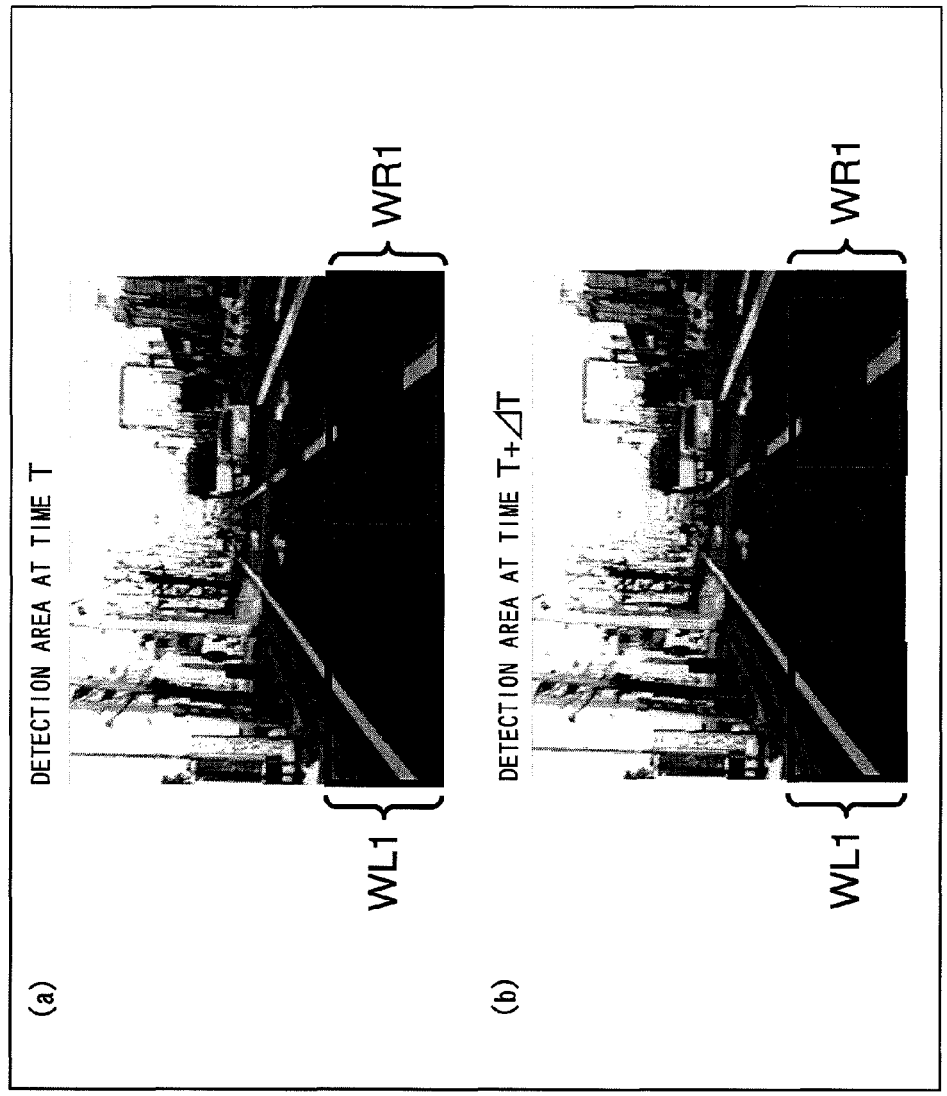
FIG. 17 is a diagram illustrating a manner, in the second embodiment, of narrowing down areas in which white line detection is performed.

On the other hand, as illustrated in FIG. 17, when the white line is detected, target areas for the detection (subsequent target areas for the detection) after a time interval ΔT has elapsed can be narrowed, so that an amount of calculation is reduced. FIG. 17(a) shows the target areas for the detection in a default state at time T. When the white line is detected at time T, the target areas for the detection at time T+ΔT are narrowed, as illustrated in FIG. 17(b), down to areas in which the white line has been detected at time T. Further, when the white line is not detected, sizes of the areas after a time interval ΔT has elapsed are kept in the default state.

The operation is described again with reference to the flowchart of FIG. 15.

Whether or not both the "reliable" areas and the "unreliable" areas are included in a mixed manner is determined in step S302. When both "reliable" areas and "unreliable" areas are not included, the processing proceeds to step S303. In step S303, whether or not all the areas are "reliable" areas is determined. When all the areas are determined as "reliable", the processing proceeds to steps S110 and S111. When none of areas are determined as "reliable", in other words, all the areas are determined as "unreliable", the processing proceeds to step S112. Here, operations performed in respective steps S110, S111, and S112 are the same as those performed in the flowchart of FIG. 5, and description thereof is omitted.

On the other hand, when both "reliable" areas and "unreliable" areas are included in a mixed manner, the processing proceeds to step S304. The case where both "reliable" areas and "unreliable" areas are included in a mixed manner means, for example, a case where among areas set on the photographed image as in FIG. 16, the area WR1 and the area WL1 are determined as "reliable", the area WR2 and the area WL2 are "reliable", and the area WR3 and the area WL3 are "unreliable".

In step S304, coordinate transformation of the detected white line from the window coordinate system to the local coordinate system is performed on the areas determined as "reliable".

Next, in the areas where the white line is detected, the road shape data is corrected based on the white line detection result, and in the areas where the white line is not detected, the road shape data is properly corrected so as to prevent the road shape based on data from being distorted around the boundary between the area in which the white line is detected and the area in which the white line is not detected (step S305). Here, correction processing for preventing the road shape based on data from being distorted around the boundary between the areas is described with reference to FIG. 18 through FIG. 21.

Figure 18:
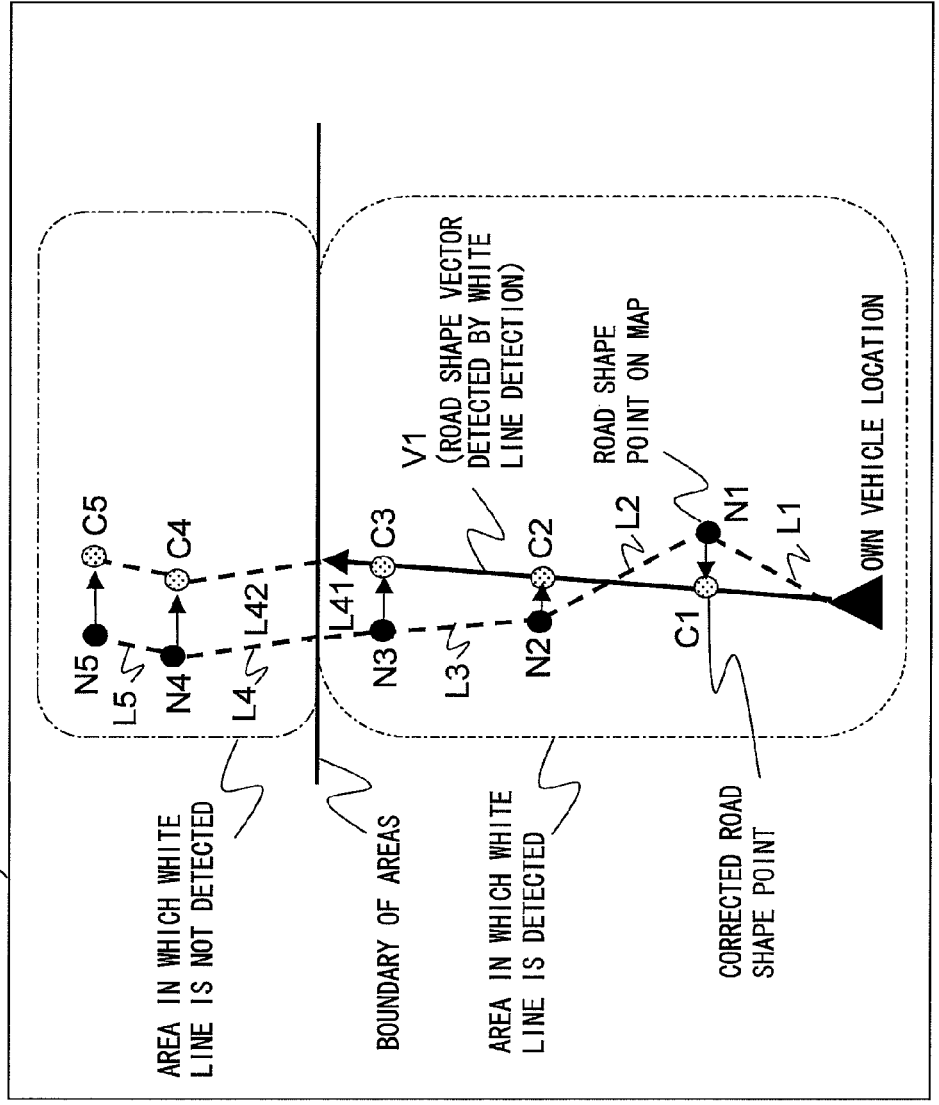
FIG. 18 is a diagram of a first example in the second embodiment illustrating a manner of correcting road shape data when road shape points in the field-of-view cone are divided into the road shape points in the area in which the white line is detected, and the road shape points in the area in which the white line is not detected, such that the road shape around the boundary between the areas is not distorted.

FIG. 18 illustrates a manner of correcting road shape data in a case where road shape points in the field-of-view cone are divided into road shape points included in a area in which the white line is detected, and road shape points included in an area in which the white line is not detected, such that the road shape around the boundary between the areas is not distorted.

In FIG. 18, each road shape point is represented by the above-described local coordinate system.

In FIGS. 18, N1 to N5 indicate the road shape points on the map. L1 is a line (link) that links the vehicle location with the road shape point N1, L2 is a line (link) that links the road shape point N1 with the road shape point N2, L3 is a line (link) that links the road shape point N2 with the road shape point N3, L4 is a line (link) that links the road shape point N3 with the road shape point N4, and L5 is a line (link) that links the road shape point N4 with the road shape point N5. The link L4 has L41 within an area in which the white line is detected and L42 within an area in which the white line is not detected. V1 indicates a road shape vector (a first road shape vector) which is created based on the white line detection result.

As illustrated in FIG. 18, in the area in which the white line is detected, a perpendicular line is drawn from the road shape point toward the road shape vector V1, and correction is performed such that an intersection point of the perpendicular line with the road shape vector is set as a corrected road shape point. C1 to C3 indicate the corrected road shape points.

On the other hand, when the road shape data is left uncorrected in the area in which the white line is not detected, a straight line that links the corrected road shape point C3 and the uncorrected road shape point N4 causes the road shape based on data to be distorted. Here, "road shape to be distorted" means that the road shape is sharply bent around the boundary between the area in which the white line is detected and the area in which the white line is not detected. Accordingly, the generated route guidance object is distorted in the middle thereof, so that the route guidance object becomes difficult to be recognized. The state that the "road shape to be distorted" can be interpreted as a state where an angle of a vector which links the road shape point C3 with the road shape point N4 with respect to a traveling direction (in an upward direction of the drawing) of the vehicle is larger than an angle of a vector which links the road shape point N3 with the road shape point N4 with respect to the traveling direction of the vehicle.

Accordingly, as illustrated in FIG. 18, in order not to cause the road shape to be distorted around the boundary between the areas, the road shape points N4 and N5, and the links L42 and L5 in the area in which the white line is not detected are shifted in the same direction as that of the road shape point N3 which has been shifted to the road shape point C3. In other words, the shifting direction is a direction perpendicular to the traveling direction of the vehicle, that is, to the road shape vector V1. Specifically, this direction is a direction in which a bending angle of the road shape around the boundary between the area in which the white line is detected and the area in which the white line is not detected becomes smaller. At this time, the road shape points N4 and N5, and the links L42 and L5 are shifted such that a lower end of the link L42 coincides with an upper end of the road shape vector V1. In this manner, an angle of a line segment, which connects the corrected road shape points (C3 and C4 in FIG. 18), with respect to the road shape vector V1 becomes moderate. The corrected road shape points respectively are the nearest points, in the area in which the white line is detected and in the area in which the white line is not detected, to the boundary therebetween. Consequently, it is possible to prevent the road shape from being bent at a steep angle around the boundary between the areas whereby the shape of the route guidance object becomes smooth and easy to be recognized.

Figure 19:
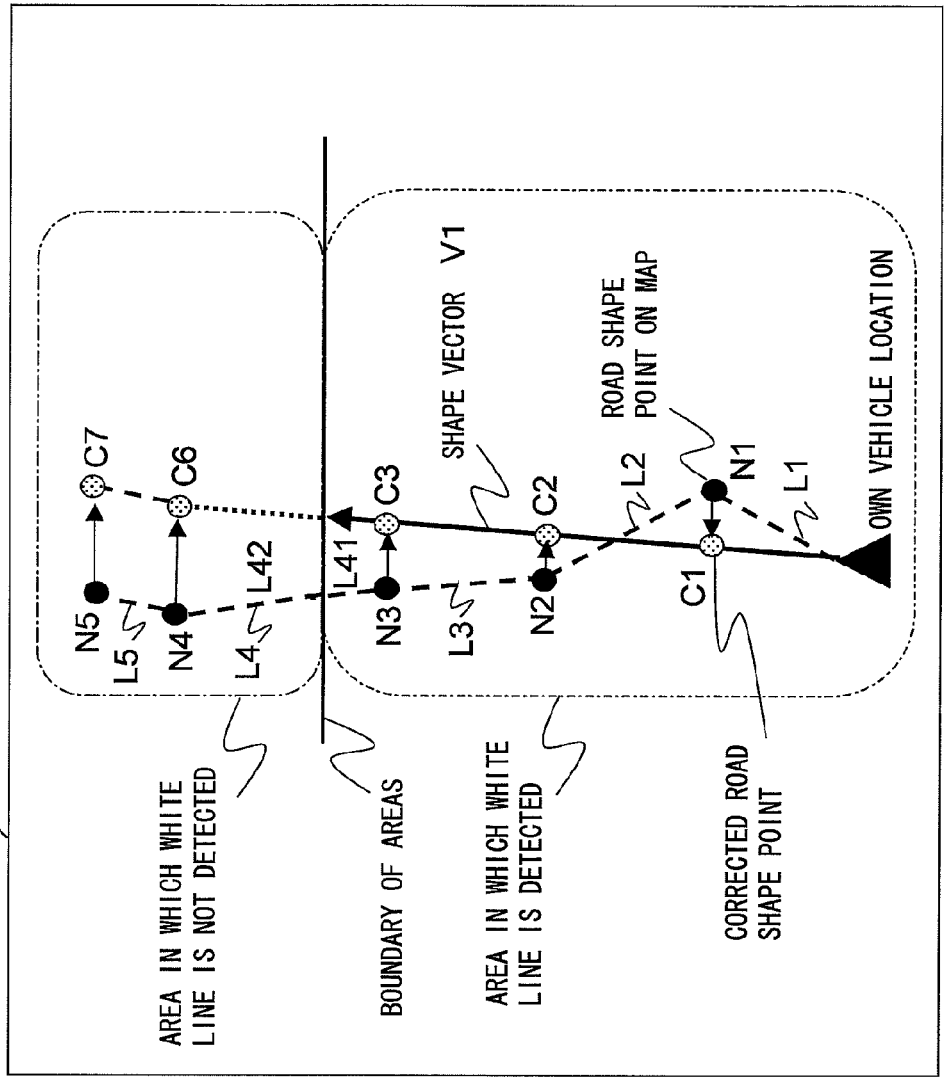
FIG. 19 is a schematic view of a second example in the second embodiment illustrating a manner of correcting road shape data when the road shape points in the field-of-view cone are divided into the road shape points in the area in which the white line is detected, and the road shape points in the area in which the white line is not detected, such that the road shape around the boundary between the areas is not distorted.

FIG. 19 illustrates another example of correcting the road shape data in a case where the road shape points in the field-of-view cone are divided into the road shape points included in the area in which the white line is detected, and the road shape points included in the area in which the white line is not detected, such that the road shape around the boundary between the areas is not distorted. In FIG. 19, each road shape point is represented by the local coordinate system.

In comparison with the example illustrated in FIG. 18, the example illustrated in FIG. 19 is different in shifting amounts of the road shape points N4 and N5 in the area in which the white line is not detected.

In FIG. 19, a perpendicular line is initially drawn from the road shape point N4, which is the nearest point in the area in which the white line cannot be detected to the vehicle location, toward an extended line (indicated by a dotted line leading from the road shape vector V1) from the road shape vector V1. Then, an intersection point of the perpendicular line with the extended line is calculated and set as a corrected road shape point C6. In other words, the road shape point is shifted to the intersection point. Subsequently, a road shape point (N5 in the figure) after N4 is shifted by the same amount and in the same direction as N4 shifted to C6. In this manner, N5 is shifted to C7. As illustrated in FIG. 19, the corrected road shape point C6 is located on the extended line from the road shape vector V1. Consequently, it is possible to prevent the road shape from being bent at a steep angle around the boundary between the areas whereby the shape of the route guidance object becomes smooth and easy to be recognized.

The road shape can be prevented from being distorted by rotational transfer of the road shape point other than manners illustrated in FIG. 18 and FIG. 19. The operation is described in detail with reference to FIG. 20 and FIG. 21.

Figure 20:
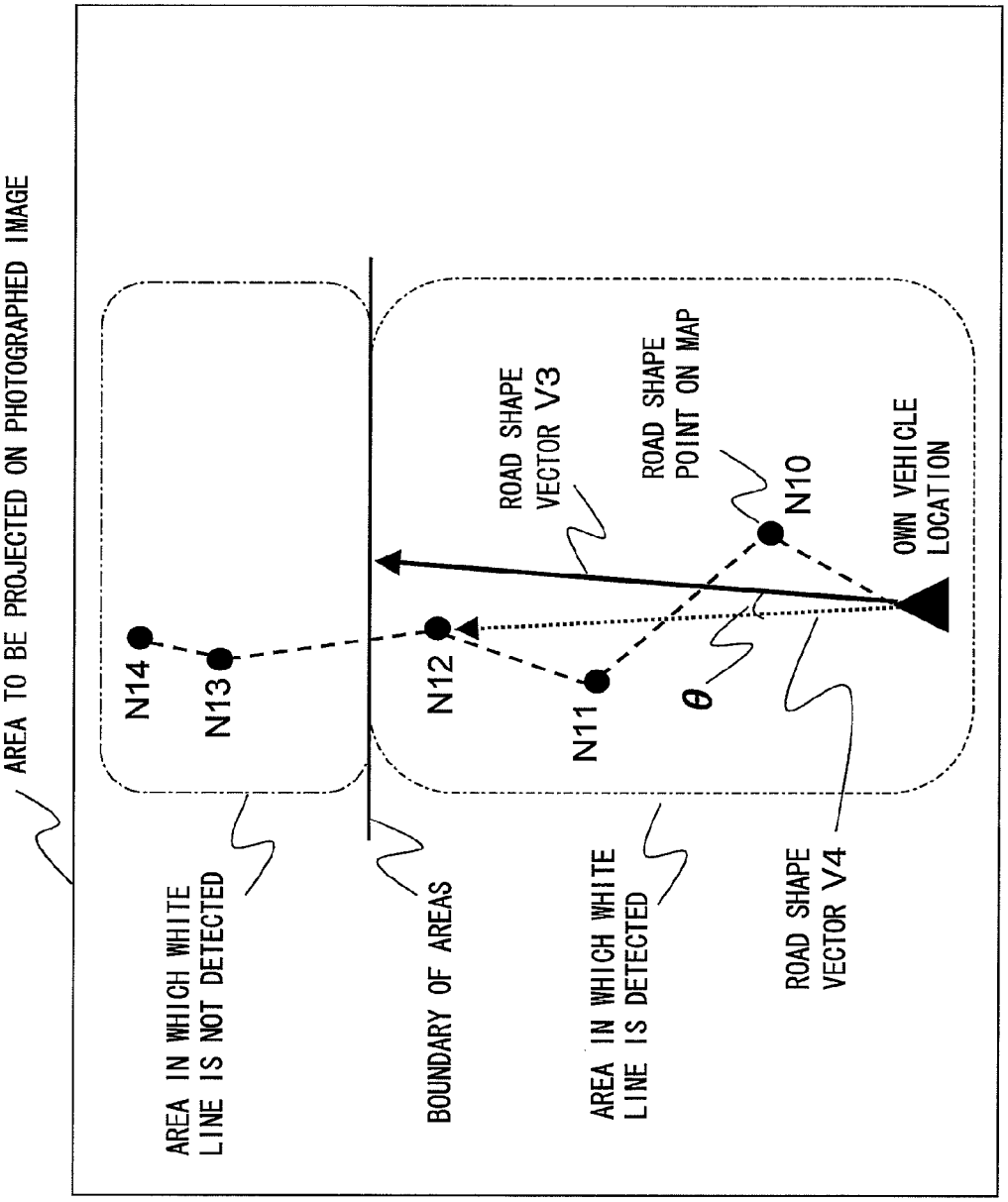
FIG. 20 is a schematic view of a third example in the second embodiment illustrating a manner of correcting road shape data when the road shape points in the field-of-view cone are divided into the road shape points in the area in which the white line is detected, and the road shape points in the area in which the white line is not detected, such that the road shape around the boundary between the areas is not distorted.

FIG. 20 illustrates an angular difference $\theta$ between a road shape vector which is created based on the white line detection result and a road shape vector which is created based on the road shape data. In FIG. 20, each road shape point is represented by the local coordinate system.

In FIGS. 20, N10 to N14 are road shape points on the map. V3 is a road shape vector (first road shape vector) which is created based on the white line detection result. V4 is a road shape vector (second road shape vector) on the map, and links the vehicle location and a farthest road shape point, in the area in which the white line is detected, from the vehicle location. An angle $\theta$ is an angle between the road shape vector V3 and the road shape vector V4.

Figure 21:
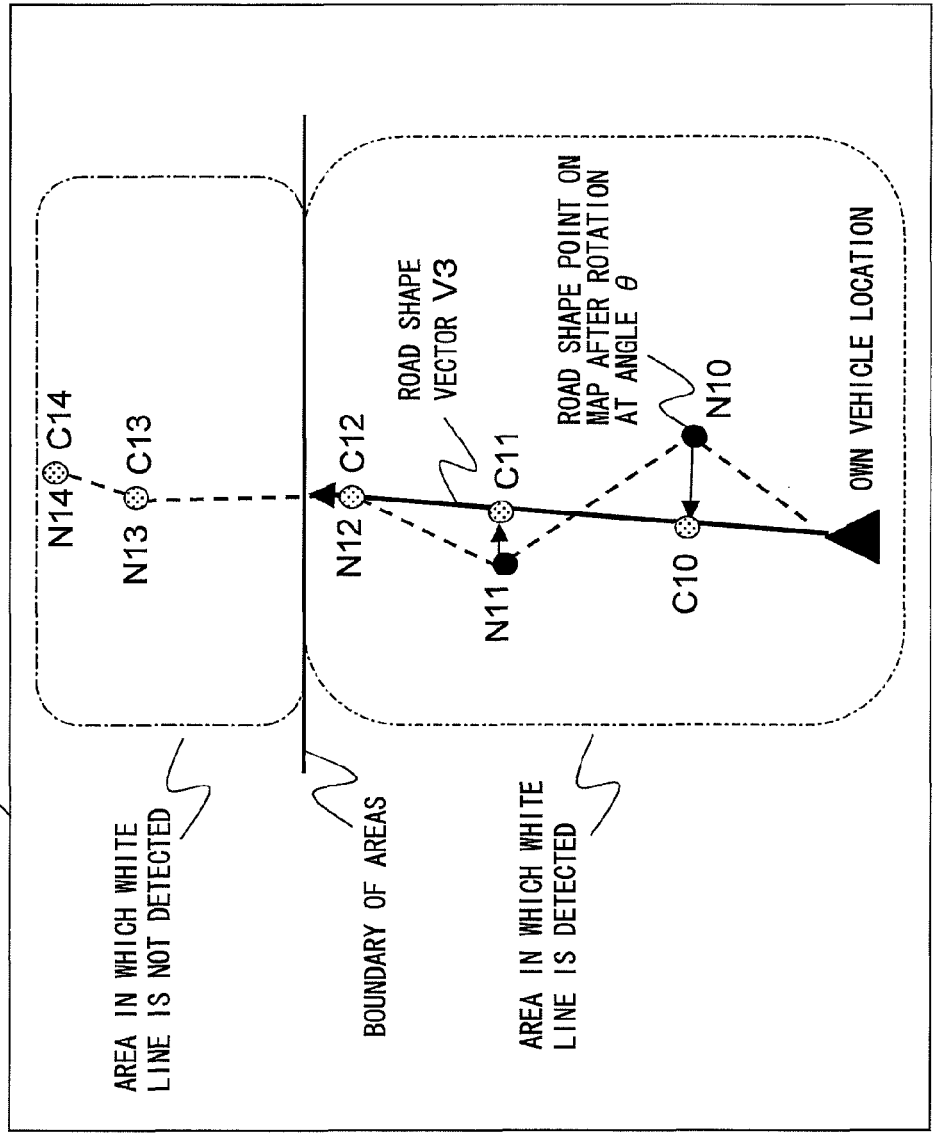
FIG. 21 is a schematic view of the third example in the second embodiment illustrating a manner of correcting road shape data when the road shape points in the field-of-view cone are divided into the road shape points in the area in which the white line is detected, and the road shape points in the area in which the white line is not detected, such that the road shape around the boundary between the areas is not distorted.

In such a case, as illustrated in FIG. 21, the road shape points N10 to N14 on the map are rotated by degrees equal to the angle $\theta$ whereby N12 is transferred to be located on the road shape vector V3. Then, perpendicular lines are respectively drawn from the road shape points (only within the area in which the white line is detected), which have been rotated by the angle $\theta$ to the road shape vector V3, and correction is performed such that respective intersection points of the perpendicular lines with the road shape vector V3 are set as corrected road shape points. The corrected road shape points are denoted by C10 to C12. The road shape points in the area in which the white line is not detected are respectively rotated by the angle $\theta$ and their locations after the rotation are set as corrected locations. The resultant road shape points are denoted by C13 and C14. Consequently, it is possible to prevent the road shape from being bent at a steep angle around the boundary between the areas whereby the shape of the route guidance object becomes smooth and easy to be recognized.

Note that any method other than the above-described methods may be applied to correct the road shape, as long as the method prevents the road shape from being distorted around the boundary between the areas.

As described above, when image recognition is performed by partitioning the photographed image in a plurality of areas, a case sometimes occurs where even though the white line on the near side has been recognized, the white line on the far side has not been recognized depending on conditions of the road ahead. Even in such a case, the road shape data is positively corrected based on the white line detection result within the area in which the white line is detected. At this time, the road shape data in the area in which the white line is not detected is corrected such that the road shape is not distorted around the boundary between the area in which the white line is detected and the area in which the white line is not detected. Consequently, it is possible to prevent the route guidance object from being extremely bent around the boundary between the areas whereby the displayed route guidance object is easy to be recognized.

In the above-described first embodiment and second embodiment, the following modifications can be made.

In generation of the guidance object (e.g., step S112 in the flowcharts of FIG. 5 and FIG. 15) in the case where the white line is not detected, for example, the road shape vector may be generated as follows based on a case where the white line has been previously detected. Specifically, an average value of angles, which are calculated by using a method similar to that for the angle $\theta$ illustrated in FIG. 20, may be stored. Then, when the white line is not detected, the road shape points may be rotated by degrees equal to the average value, and when the white line is detected the road shape data may be corrected so as to further transfer the road shape points as illustrated in FIG. 21 to generate the route guidance object by using the corrected road shape data. Accordingly, an influence of an offset error (in a certain direction) caused by an error in fixing of a camera or the like can be eliminated. This is significantly effective especially when the traveling direction is set as a link direction.

Further, when the white line is detected in some place, the white line detection processing may be omitted at a time of traveling in the same place, and the previously corrected road shape point may be retrieved.

Still further, when a vehicle other than the vehicle is also equipped with the navigation device 100 or 200, the vehicle may receive, via communication means (not shown), information on an area in which the other vehicle cannot detect the white line in order to omit the white line detection processing in the vehicle when the vehicle travels the same area. In such a case, a calculation amount can be decreased.

Still further, when a plurality of lanes lie ahead of the vehicle and the white line detection is performed so as to correct the road shape, since the route guidance object is displayed so as to be superimposed on a currently traveling lane, there is a possibility that the driver is misguided to travel without changing lanes even at a location where the driver has to change lanes.

Figure 22:
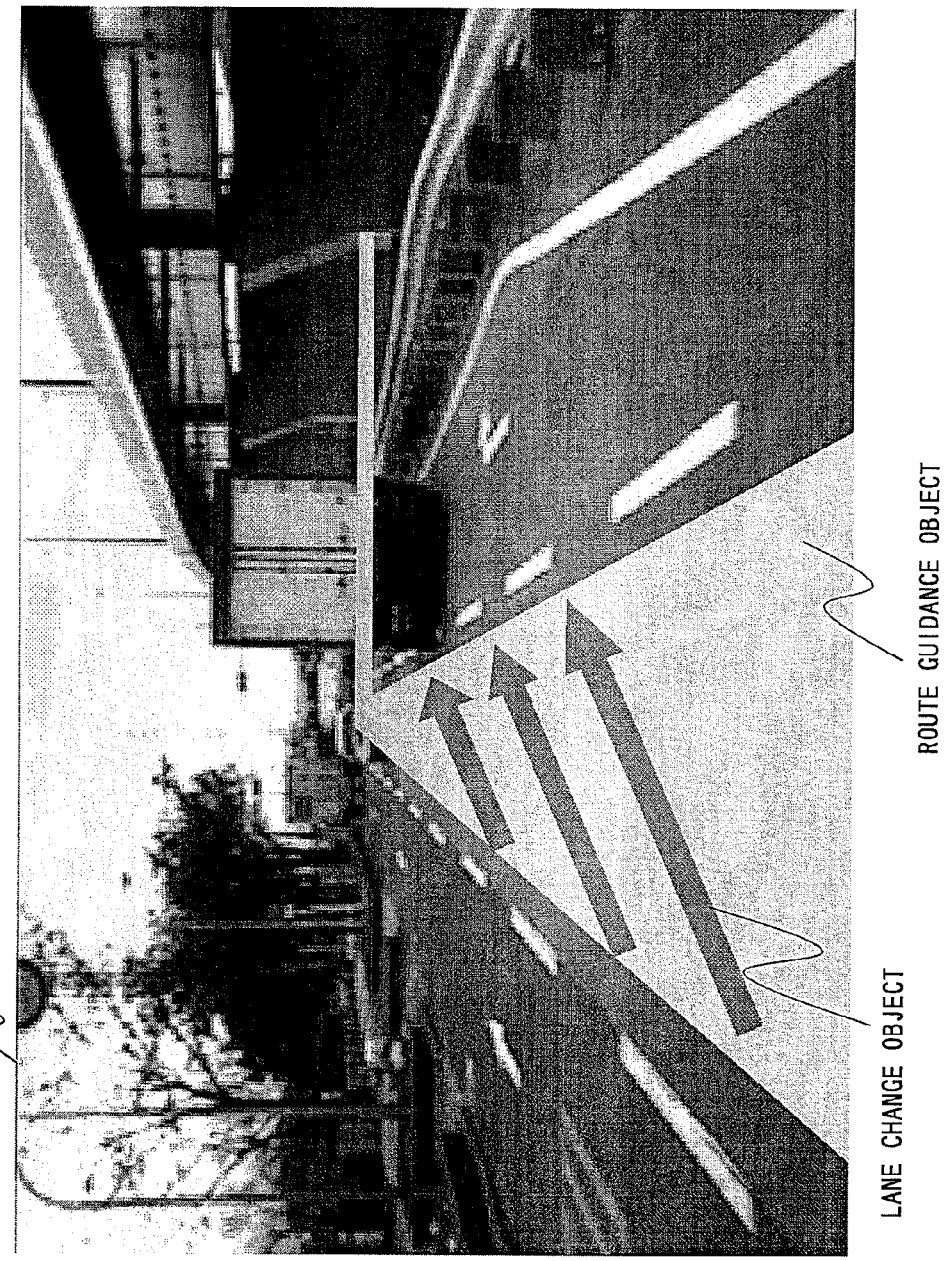
FIG. 22 is a diagram illustrating the first embodiment or in the second embodiment in which a lane change object is displayed so as to be superimposed on the route guidance object.
Figure 23:
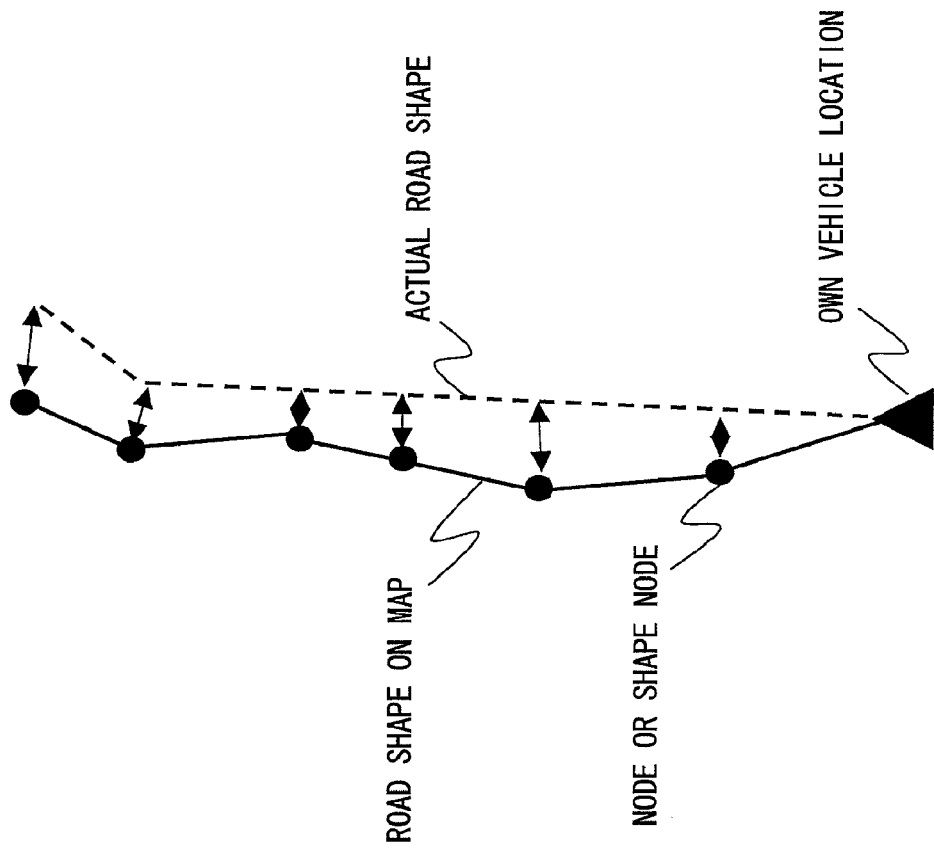
FIG. 23 is a diagram illustrating a case where a road shape based on map data is out of alignment with an actual road shape.

In such a case, a lane change object generation section (not shown) included in the navigation device 100 or 200 may generate a lane change object, and the lane change object may be superimposed on the route guidance object as shown in FIG. 22.

FIG. 22 illustrates a case where the lane change object indicating a direction of the lane change is displayed so as to be superimposed on the route guidance object.

As illustrated in FIG. 22, the object indicating the direction of the lane change is superimposed on the route guidance object. Accordingly, since a driver can accurately recognize the direction of the lane change at a location where the driver has to change lanes, the driver is secure about the lane change. In addition, the lane change object is displayed so as to be superimposed on the route guidance object, and thus, compared with a case of being superimposed on other portions, an actual background scene is not hidden, and the lane change object is easy to be recognized.

In the respective embodiments, the photographed image is obtained by the camera facing ahead of the vehicle, but the route guidance object may be displayed so as to be superimposed on a photographed image preliminarily stored in a storage medium or on a photographed image obtained via communication.

In the respective embodiments, the white line is detected as the traveling zone boundary line on the road surface, but, instead of the white line, a traveling zone boundary line indicated by raised markers, yellow lines, pebbles, and the like may be detected. The road shape data correction section corrects the road shape data based on this detection result.

Further, in the respective embodiments, the route guidance object indicating a route along which the vehicle is to travel is displayed on the photographed image of the road surface, but alternatively, a route object indicating a route along which the vehicle has traveled may be displayed on the photographed image of the road surface. The route object may be, like the route guidance object, displayed on a screen so as to be superimposed thereon in a shape of an arrow figure or a belt-like figure having a width of a road in a photographed image, for example. In addition, like the route object displayed along the photographed image of the traveling zone boundary line on the screen, the road shape data is corrected based on the detection result of the traveling zone boundary line. Image data obtained by superimposing the route object on the photographed image of the road surface is stored in a storage section. The stored image data (including a still image and a video image) may be viewed by a user after a traveling of the vehicle or may be publicized by uploading to a web site on the Internet.

The above-described embodiments are merely illustrative embodiments and do not limit the technical scope of the present invention. The present invention may be carried out in various design modifications that fall within the technical scope of the present invention.

The navigation device of the present invention is useful as a car navigation system and the like provided to a vehicle. In addition, the navigation device of the present invention is useful as a navigation device and the like provided in a mobile telephone.

The invention claimed is:

1. A navigation device which displays, on a screen, a route guidance object indicating a route along which an own a vehicle is to travel, the navigation device comprising:
   an image pickup section that obtains a photographed image ahead of a vehicle;
   a white line detection section that detects a white line on a road in the photographed image;
   a map information storage section that stores map information including road shape data which represents a road shape;
   a road shape data correction section that corrects the road shape data, based on a detection result of the white line on the road;
   a route guidance object generation section that generates the route guidance object having a shape in alignment with a road which corresponds to an optimum route searching by a route search section, based on the corrected road shape data; and
   a display section that displays the generated route guidance object so as to be superimposed on the photographed image,
   the road shape data is a set of road shape points, and
   the road shape data correction section generates a first road shape vector along the white line on the road detected by the white line detection section, draws a perpendicular line from one of the road shape points toward the road shape vector, and sets an intersection point of the road shape vector with the perpendicular line as a corrected road shape point so as to correct the road shape data.

2. The navigation device according to claim 1, further comprising:
   a reliability determination section that determines whether or not the detection result of the white line on the road is reliable, wherein
   when the detection result of the white line on the road is determined as reliable by the reliability determination section, the road shape correction section corrects the road shape data.

3. The navigation device according to claim 1, wherein the road shape data is a set of road shape points, and
   the road shape data correction section, when the photographed image includes an area in which the white line on the road is detected and an area in which the white line on the road is not detected in a mixed manner, corrects the road shape data in the area in which the white line on the road is not detected such that an angle, with respect to the first road shape vector, of a line segment that links respective road shape points in both of the areas becomes moderate, the respective road shape points being nearest points in the area in which the white line on the road is detected and in the area in which the white line on the road is not detected, to a boundary between the areas.

4. The navigation device according to claim 3, wherein the road shape data correction section corrects the road shape data by shifting, parallel to the perpendicular line, the road shape point in the area in which the white line on the road is not detected.

5. The navigation device according to claim 3, wherein the road shape data correction section calculates an angle θ between the first road shape vector and a second road shape vector which is obtained from a link between a vehicle location and a road shape point that is in the area in which the white line on the road is detected and is farthest in the area from the vehicle location, and rotates each of the road shape points, by angle θ, in the area in which the white line on the road is detected and the area in which the white line on the road is not detected so as to allow the farthest road shape point to be located on the first road shape vector so as to correct the road shape data.

6. The navigation device according to claim 5, further comprising:
   an angle difference storage section that stores angle θ, wherein
   the road shape data correction section calculates, when the white line detection section does not detect the white line on the road, an average value of the angle θ previously stored, and rotating road shape points by degrees equal to the average value so as to correct the road shape data.

7. The navigation device according to claim 1, further comprising:
   a lane change object generation section that generates a lane change object indicating a direction for a lane change, wherein the display section displays the lane change object so as to be superimposed on the route guidance object.

8. A navigation method for displaying on a screen a route guidance object indicating a route along which a vehicle is to travel, the navigation method comprising:
- an image pickup step of obtaining, using an image pickup section, a photographed image ahead of a vehicle;
- a white line detection step of detecting, using a white line detection section, a white line on a road in the photographed image;
- a map information storage step of storing, using a map information storage section, map information including road shape data which represents a road shape;
- a road shape data correction step of correcting, using a road shape data correction section, the road shape data, based on a detection result of the white line on the road;
- a route guidance object generation step of generating, using a route guidance object generation section, the route guidance object having a shape in alignment with a road which corresponds to an optimum route searching by a route search section, based on the corrected road shape data; and
- a display step of displaying, using a display section, the generated route guidance object on a screen along the white line on the road,
- wherein the display step displays the route guidance object so as to be superimposed on the photographed image,
- the road shape data is a set of road shape points, and
- the road shape data correction step generates a first road shape vector along the white line on the road detected by the white line detection step, draws a perpendicular line from one of the road shape points toward the road shape vector, and sets an intersection point of the road shape vector with the perpendicular line as a corrected road shape point so as to correct the road shape data.

9. A non-transitory computer-readable recording medium storing a navigation program for displaying on a screen a route guidance object indicating a route along which a vehicle is to travel, the navigation program causing a computer to execute steps comprising:
- an image pickup step of obtaining a photographed image ahead of a vehicle;
- a white line detection step of detecting a white line on a road in the photographed image;
- a map information storage step of storing map information including road shape data which represents a road shape;
- a road shape data correction step of correcting the road shape data, based on a detection result of the white line on the road;
- a route guidance object generation step of generating the route guidance object having a shape in alignment with a road which corresponds to an optimum route searching by a route search step, based on the corrected road shape data; and
- a display step of displaying the generated route guidance object on a screen along the white line on the road,
- wherein the display step displays the route guidance object so as to be superimposed on the photographed image,
- the road shape data is a set of road shape points, and
- the road shape data correction step generates a first road shape vector along the white line on the road detected by the white line detection step, draws a perpendicular line from one of the road shape points toward the road shape vector, and sets an intersection point of the road shape vector with the perpendicular line as a corrected road shape point so as to correct the road shape data.

* * * * *

UNITED STATES PATENT AND TRADEMARK OFFICE
CERTIFICATE OF CORRECTION

| | | |
|---|---|---|
| PATENT NO. | : 8,239,131 B2 | Page 1 of 1 |
| APPLICATION NO. | : 12/663306 | |
| DATED | : August 7, 2012 | |
| INVENTOR(S) | : Tsuyoshi Kindo et al. | |

It is certified that error appears in the above-identified patent and that said Letters Patent is hereby corrected as shown below:

On the Title Page

In section (86), "PCT No.: PCT/JP2008/001419 § 371(c)(1), (2), (4) Date: Jul. 7, 2010" should read
-- PCT No.: PCT/JP2008/001419 § 371(c)(1), (2), (4) Date: Jan. 7, 2010 --.

Signed and Sealed this
Twenty-third Day of October, 2012

David J. Kappos
*Director of the United States Patent and Trademark Office*